United States Patent
Beeken et al.

(10) Patent No.: US 9,632,724 B1
(45) Date of Patent: Apr. 25, 2017

(54) POINT-IN-TIME COPY WITH CHAIN CLONING

(71) Applicant: International Business Machines Corporation, Armonk, NY (US)

(72) Inventors: Christopher B. E. Beeken, Eastleigh (GB); Joanna K. Brown, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 7 days.

(21) Appl. No.: 14/880,716

(22) Filed: Oct. 12, 2015

(51) Int. Cl.
*G06F 12/08* (2016.01)
*G06F 3/06* (2006.01)

(52) U.S. Cl.
CPC ............ *G06F 3/065* (2013.01); *G06F 3/0619* (2013.01); *G06F 3/0689* (2013.01)

(58) Field of Classification Search
CPC ....... G06F 3/065; G06F 3/0619; G06F 3/0689
USPC ........ 711/162, 154, 156, 202, 203; 707/639, 707/649
See application file for complete search history.

(56) References Cited

U.S. PATENT DOCUMENTS

| | | | | |
|---|---|---|---|---|
| 5,761,678 A * | 6/1998 | Bendert | ................ | G06F 9/4428 707/639 |
| 6,128,016 A * | 10/2000 | Coelho | ................... | G06F 3/033 707/999.102 |
| 6,868,417 B2 * | 3/2005 | Kazar | ............... | G06F 17/30106 |
| 7,302,500 B2 * | 11/2007 | Powell | ................... | G06F 3/061 710/20 |
| 7,386,695 B2 | 6/2008 | Fuente | | |
| 7,555,586 B2 * | 6/2009 | Powell | ................... | G06F 3/061 710/104 |
| 7,558,885 B2 * | 7/2009 | Powell | ................... | G06F 3/061 710/5 |
| 7,788,244 B2 * | 8/2010 | Xu | ...................... | G06F 11/1435 707/704 |
| 7,870,356 B1 * | 1/2011 | Veeraswamy | ......... | G06F 3/0607 711/100 |
| 7,917,461 B2 * | 3/2011 | Kazar | ............... | G06F 17/30106 |
| 7,991,973 B2 * | 8/2011 | Jacobson | .............. | G06F 3/0611 707/639 |
| 8,082,407 B1 * | 12/2011 | Chatterjee | ............. | G06F 9/4416 707/639 |
| 8,352,518 B2 * | 1/2013 | Kazar | ............... | G06F 17/30106 707/812 |

(Continued)

OTHER PUBLICATIONS

Mell et al., "The NIST Definition of Cloud Computing: Recommendations of the National Institute of Standards and Technology," Special Publication 800-145, National Institute of Standards and Technology, Sep. 2011, 7 pages, Gaithersburg, MD.

*Primary Examiner* — Stephen Elmore
(74) *Attorney, Agent, or Firm* — Joseph W. Cruz

(57) ABSTRACT

A method and system for storage copy with chain cloning are provided, including providing a volume with one or more snapshots in the form of a dependency chain, where the volume and one or more snapshots are volume nodes in the dependency chain and providing associated metadata required to maintain the one or more snapshots; cloning the dependency chain to create at least one a sparse copy chain including sparse copies of the volume and the one or more snapshots resulting in sparse volume nodes, resulting in a lattice structure of the dependency chain of volume nodes and one or more sparse copy chains of cloned volume nodes.

21 Claims, 21 Drawing Sheets

(56) References Cited

U.S. PATENT DOCUMENTS

| | | | |
|---|---|---|---|
| 8,402,428 B2* | 3/2013 | Alex | G06F 8/316 |
| | | | 717/106 |
| 8,655,852 B2 | 2/2014 | Agombar et al. | |
| 8,688,936 B2 | 4/2014 | Agombar et al. | |
| 8,719,523 B2 | 5/2014 | Beeken et al. | |
| 8,732,419 B2* | 5/2014 | Beeken | G06F 3/0605 |
| | | | 711/112 |
| 8,788,770 B2* | 7/2014 | Agombar | G06F 3/065 |
| | | | 711/162 |
| 8,788,772 B2 | 7/2014 | Clayton et al. | |
| 8,793,453 B2 | 7/2014 | Agombar et al. | |
| 8,856,472 B2* | 10/2014 | Beeken | G06F 3/065 |
| | | | 711/112 |
| 8,868,860 B2* | 10/2014 | Beeken | G06F 3/065 |
| | | | 711/112 |
| 9,280,396 B2* | 3/2016 | Thoppai | G06F 17/30171 |
| 2008/0037854 A1* | 2/2008 | Grossman | G06F 8/70 |
| | | | 382/135 |

* cited by examiner

MAPPING FOR SOURCE TO VOLUME

MAPPING FOR TARGET TO VOLUME

MAPPING FOR SPARSE SOURCE TO VOLUME

MAPPING FOR SPARSE TARGET TO VOLUME

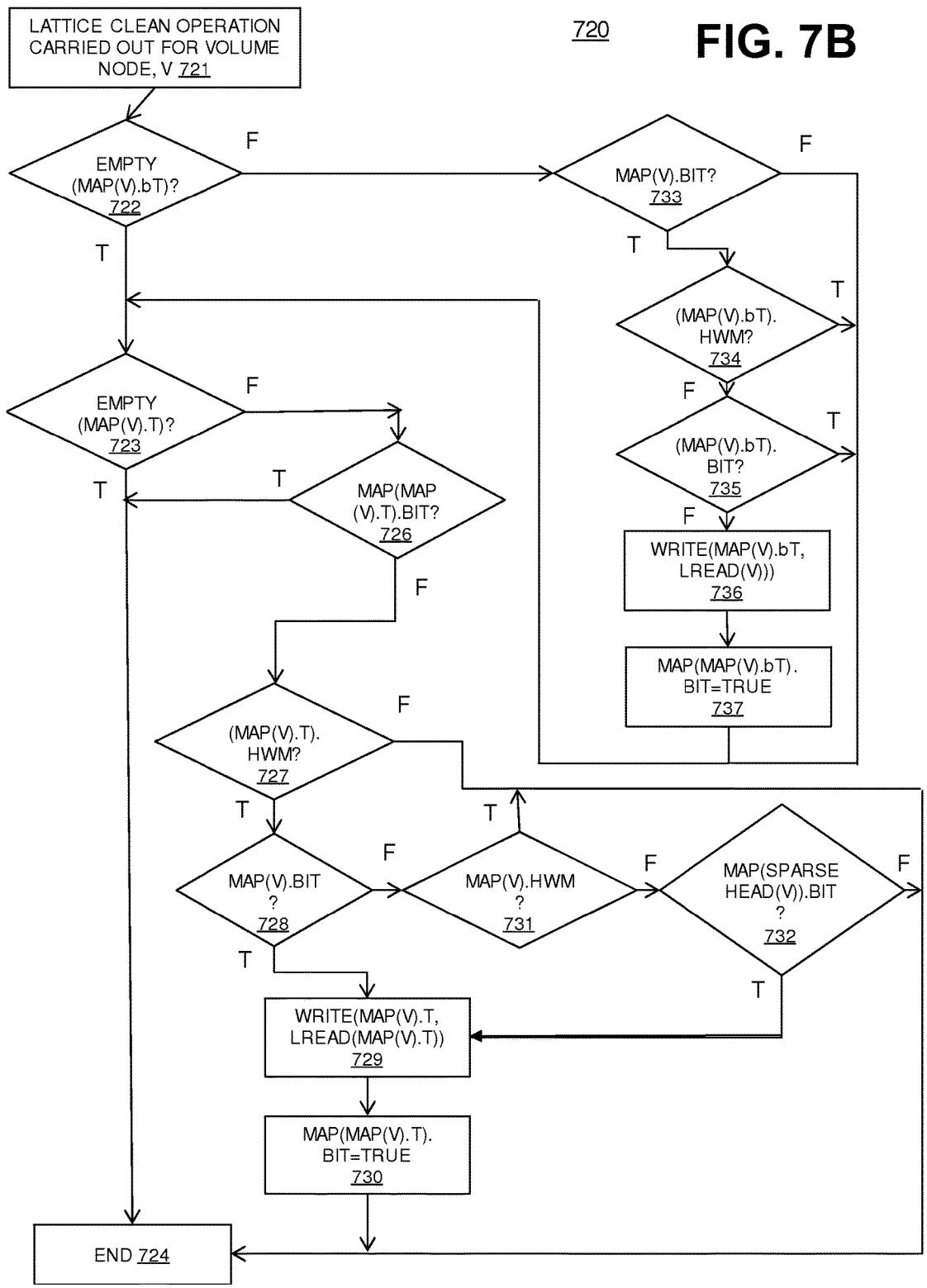

POINT-IN-TIME COPY WITH CHAIN CLONING

BACKGROUND

The present disclosure relates to computer storage systems, and more specifically, to storage with point-in-time copy with chain cloning.

In the field of computer storage systems, there is increasing demand for what have come to be described as "advanced functions." Such functions go beyond the simple Input/Output (I/O) functions of conventional storage controller systems. Advanced functions depend on the control of metadata used to retain state data about the real or "user" data stored in the system. The manipulations available using advanced functions enable various actions to be applied quickly to virtual images of data, while leaving the real data available for use by user applications.

One such advanced function is point-in-time copy. One example of point-in-time copy is IBM® FlashCopy®. IBM, and FlashCopy are trademarks of International Business Machines Corporation, registered in many jurisdictions worldwide.

Point-in-time copy is a feature supported on various storage devices that allows nearly instantaneous point-in-time copies of entire logical volumes or data sets to be made. The point-in-time function enables one to make full volume copies of data, with the copies immediately available for read or write access. The copy may be used with standard backup tools that are available in a computing environment to create backup copies on tape.

"Snapshot" is a common industry term denoting the ability to record the state of a storage device at any given moment and preserve that snapshot as a guide for restoring the storage device in the event that it fails. A snapshot primarily creates a point-in-time copy of the data. Typically, snapshot copy is done instantly and made available for use by other applications such as data protection, data analysis, and reporting, and data replication applications. The original copy of the data continues to be available to the applications without interruption, while the snapshot copy is used to perform other functions on the data. A snapshot may be a point-in-time copy that is dependent on the primary disk.

A snapshot may be accomplished using various implementations including a copy-on-write procedure or a redirect-on-write procedure. If there is a multi-tiered environment, then copy-on-write is the solution that provides the best stability with respect to the tier used by a particular volume. In a copy-on-write procedure, currently existing data in a region on the primary disk is written to the backup disk when a write is being made to the region on the primary disk. Thus, the backup disk will contain data that has been overwritten on the primary disk, as opposed to a complete copy of the primary disk. This type of backup copy typically results in a thinly provisioned volume, which may reduce storage.

In order to minimize the production volume Input/Output Operations Per Second (IOPs), solutions use a 'cascading' approach to allow multiple different point-in-time copies to be taken of a single production volume without leading to an increasing in IOPs to the physical storage.

A series of snapshot copies may be cascaded together to represent the primary disk at various times. However, the snapshot copies typically remain dependent on the primary disk to reassemble a complete copy of the primary disk. Therefore, a snapshot is a point-in-time copy where the target only holds the changed data necessary to present the point-in-time copy of the source. Data is only copied to the target disk if it is changed on the source. The target disk is generally dependent on some of the data on the source disk in order to present the point-in-time copy.

This disclosure is concerned with the problem of cloning a volume and all of its snapshots. This will be required if the user wants to move a volume and all of its snapshots to another storage pool or if they want a new copy of a volume and its snapshots. The aim is to instantly clone a volume, its snapshots (maintaining any space-efficiency), and all the metadata required to maintain these snapshots. Because none of these operations can be performed automatically but may appear to have been done automatically, the images need to be maintained as the copying process progresses while also processing I/O to the original volume and its snapshots and to the clone and its snapshots.

SUMMARY

According to a first aspect of the present disclosure there is provided a method for storage copy with chain cloning, including: providing a volume with one or more snapshots in the form of a dependency chain, where the volume and one or more snapshots are volume nodes in the dependency chain and providing associated metadata required to maintain the one or more snapshots; cloning the dependency chain to create at least one a sparse copy chain including sparse copies of the volume and the one or more snapshots resulting in sparse volume nodes, resulting in a lattice structure of the dependency chain of volume nodes and one or more sparse copy chains of cloned volume nodes; defining mappings to a volume node from source and target volume nodes in the dependency chain and sparse source and sparse target volume nodes in the sparse copy chains; and defining metadata for each volume node including a state indicating if the data is on the target volume node and a high water mark to indicate which of the dependency chain and one or more sparse copy chains to go to if it is not on the target volume node.

The method may include maintaining the mappings and the metadata during volume node operations and modifying input/output operations while the volume is part of a cloned sparse copy chain using the mappings and the metadata.

The metadata may also include an indication of a head volume node of a sparse copy chain for use during volume node copy and clean operations. The metadata state may be a bitmap that is set to true if the data is on the target volume node.

The method may include repeating the cloning step to add a new sparse copy chain between the original volume dependency chain and a previous cloned mirror chain.

The lattice structure may have dependency chain operations in a first direction and sparse copy chain operations in a second direction perpendicular to the first direction.

The method may include performing a read operation for a volume node, including: determining if a mapping exists from a source volume node or sparse copy volume node to the volume node; checking the volume node metadata to determine if the volume node has a target state indicated; and checking the volume node metadata to determine a high water mark indication of the correct chain of a target node.

The method may include performing a write operation for a volume node, including: referencing mappings and metadata prior to carrying out the write operation, if required, carrying out write operations to mappings; and updating mappings and metadata after the write operation.

The method may include performing a copy operation for a volume node, including: carrying out a write operation to write a lattice read of a volume node to the volume node when required.

The method may include performing a clean operation for a volume node, including carrying out write operations to clean up the metadata.

According to a second aspect of the present disclosure there is provided a system for storage copy with chain cloning, including: a processor and a memory configured to provide computer program instructions to the processor to execute the function of the following components; a point-in-time copy component for providing a volume with one or more snapshots in the form of a dependency chain, where the volume and one or more snapshots are volume nodes in the dependency chain and providing associated metadata required to maintain the one or more snapshots a cloning component for cloning the dependency chain to create at least one a sparse copy chain including sparse copies of the volume and the one or more snapshots resulting in sparse volume nodes; a lattice structure component for creating a lattice structure of the dependency chain of volume nodes and one or more sparse copy chains of cloned volume nodes; a mapping component for defining mappings to a volume node from source and target volume nodes in the dependency chain and sparse source and sparse target volume nodes in the sparse copy chains; and a metadata component for defining metadata for each volume node including a state indicating if the data is on the target volume node and a high water mark to indicate which of the dependency chain and one or more sparse copy chains to go to if it is not on the target volume node.

The mapping component and the metadata component may maintain the mappings and the metadata during volume node operations and modifying input/output operations while the volume is part of a cloned sparse copy chain using the mappings and the metadata.

The metadata component may define metadata including an indication of a head volume node of a sparse copy chain for use during volume node copy and clean operations.

The cloning component may be capable of repeating the cloning step to add a new sparse copy chain between the original volume dependency chain and a previous cloned mirror chain.

The lattice structure may have dependency chain operations in a first direction and sparse copy chain operations in a second direction perpendicular to the first direction.

The system may include a read operation component for performing a read operation for a volume node. The system may include a write operation component for performing a write operation for a volume node. The system may include a copy operation component for performing a copy operation for a volume node. The system may include a clean operation component for performing a clean operation for a volume node.

According to a third aspect of the present disclosure there is provided a computer program product for storage copy with chain cloning, the computer program product including a computer readable storage medium having program instructions embodied therewith, the program instructions executable by a processor to cause the processor to: providing a volume with one or more snapshots in the form of a dependency chain, where the volume and one or more snapshots are volume nodes in the dependency chain and providing associated metadata required to maintain the one or more snapshots; cloning the dependency chain to create at least one a sparse copy chain including sparse copies of the volume and the one or more snapshots resulting in sparse volume nodes, resulting in a lattice structure of the dependency chain of volume nodes and one or more sparse copy chains of cloned volume nodes; defining mappings to a volume node from source and target volume nodes in the dependency chain and sparse source and sparse target volume nodes in the sparse copy chains; and defining metadata for each volume node including a state indicating if the data is on the target volume node and a high water mark to indicate which of the dependency chain and one or more sparse copy chains to go to if it is not on the target volume node.

The described aspects of the disclosure provide the advantage of enabling cloning of a volume and all its snapshots while maintaining metadata. This enables a user to move a volume and all its snapshots to another storage pool or if the user requires a new copy of the volume and all its snapshots.

The copy images are advantageously maintained as the copying process progresses while also enabling processing I/O to the original volume and its snapshots and to the clone and its snapshots.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

FIGS. 7A and 7B are flow diagrams of a clean operation of a method, according to various embodiments.

Figure 1A:
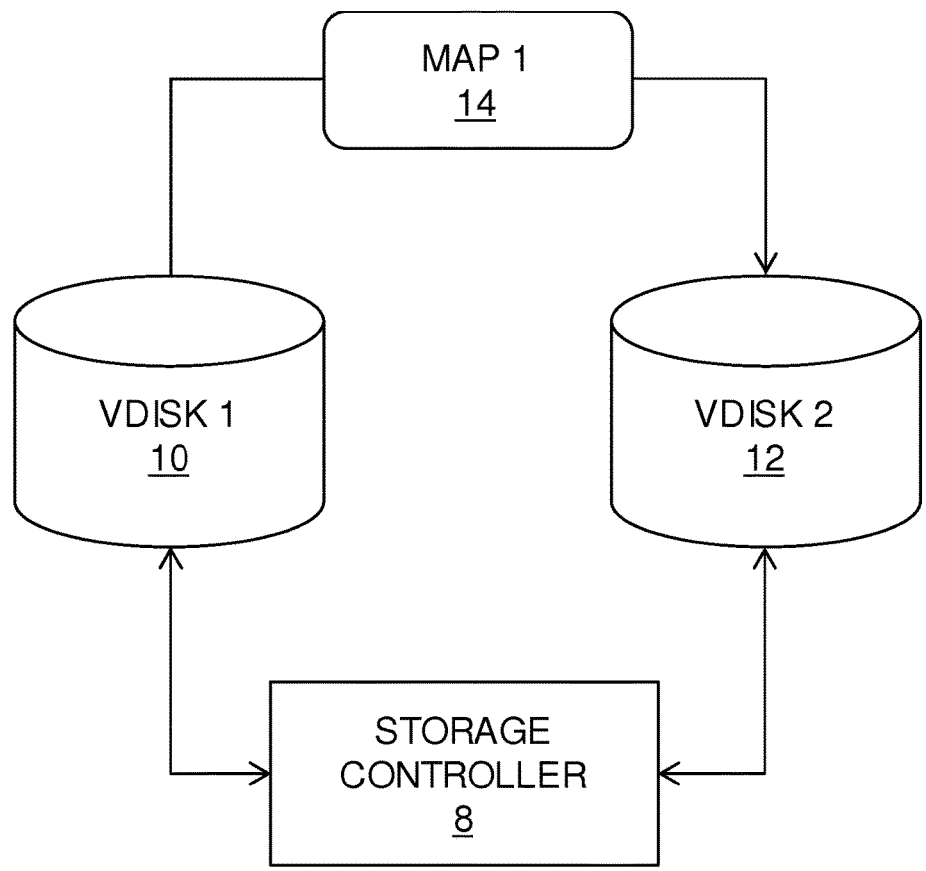
FIG. 1A is a schematic diagram showing a backup process using a storage controller and two storage disks, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The described method and system solves the problem of cloning a volume and all of its snapshots by extending the dependency chain into a lattice structure. Moreover, it achieves this without increasing the metadata footprint above that of known methods.

Point-in-time copy implementations achieve the illusion of the existence of a second image by redirecting read I/O addressed to the second image (henceforth Target) to the original image (henceforth Source), unless that region has been subject to a write. Where a region has been the subject of a write (to either Source or Target), then to maintain the illusion that both Source and Target own their own copy of the data, a process is invoked which suspends the operation of the write command, and without it having taken effect, issues a read of the affected region from the Source, applies the read data to the Target with a write, then (and only if all steps were successful) releases the suspended write. Subsequent writes to the same region do not need to be suspended since the Target will already have its own copy of the data. This copy-on-write technique may be used in many environments.

Implementations of point-in-time rely on a data structure that governs the decisions discussed above, namely, the decision as to whether reads received at the Target are issued to the Source or the Target, and the decision as to whether a write may be suspended to allow the copy-on-write to take place. The data structure essentially tracks the regions or grains of data that have been copied from source to target, as distinct from those that have not. In its simplest form, this data structure is maintained in the form of a bitmap showing which grains have been written to, and which are untouched by write activity.

Some storage controllers allow a user to configure more than one target for a given source. This has a number of applications. For instance, different experiments could be run against each of the targets. In another example, the targets might be taken at different times (e.g. different days in the week), and allow historical access to the disk, perhaps for the purpose of recovering from some data corruption, such as might be caused by a virus.

A storage system with multiple copy targeting is provided in U.S. Pat. No. 7,386,695 B2 (Fuente, Carlos F. "Storage System with Multiple Copy Targeting", Jun. 10, 2008) which discloses a storage controller, co-operable with host computer apparatus, and a plurality of controlled storage apparatus, which comprises a host write component operable to write a data object to a source data image at one of the plurality of controlled storage apparatus: a first copy component responsive to a first metadata state and operable to control copying of the data object to a first target data image at one of the plurality of controlled storage apparatus; a second copy component responsive to a second metadata state and operable to perform one of: controlling copying of the data object to a second target data image at one of the plurality of controlled storage apparatus; and causing the first copy component to perform copying of the second target data image to the first target data image.

U.S. Pat. No. 7,386,695 B2 describes a cascaded configuration of storage volumes including implementing point-in-time copy functionality that optimizes source writes at the expense of target I/O.

FIG. 1A depicts a backup process using a storage controller 8 and two storage disks 10, 12. The disks 10 and 12 could form part of a larger array of disks, and may form part of an enterprise storage solution. The disks 10 and 12 could be part of a storage solution relating to a commercial website, for example. If at any time a backup needs to be made of the content of vdisk1, then a point-in-time copy instruction can be sent from the storage volume controller 8 to that disk 10, which defines a source disk 10 (vdisk1) and also a target disk 12 (vdisk2), which is the target of the point-in-time copy. The point-in-time copy instruction creates a point-in-time copy of the image of the specific vdisk that is the source disk 10.

In the embodiment of FIG. 1A, the source disk 10 of a first point-in-time copy instruction is vdisk1 10, and the target disk 12 is vdisk2 12. The point-in-time copy instruction starts the point-in-time copy process, which creates a map 14 from the source disk 10 to the target disk 12. This map is labeled MAP 1 in FIG. 1. The image of vdisk1 at this specific point in time is now available on vdisk2. This creates a backup of the data on vdisk1, and may allow tests and other administration tasks to be run on the data of vdisk1, without the attendant danger of losing any of the original data, as it is preserved on the original source disk.

When a point-in-time copy is made, it creates a link between the two disks 10 and 12, as defined by the map 14. Data may now be copied across in the background, with the additional requirement that any access to vdisk2 (as the target disk 12) may immediately cause the relevant parts of the image of vdisk1 to be copied across, and also any access to vdisk1 which would result in a change to the image stored by that disk 10 will also cause the unaltered data to be immediately copied across to the target disk 12, prior to the change being made. In this way, the vdisk2, to an outside user, stores the point-in-time copy of vdisk1, although data may only be physically copied across under the circumstances described above.

A storage volume that is the target volume of a backup process such as a point-in-time copy function can also be the source volume of a further backup process, thus creating a cascade of storage volumes.

Figure 1B:
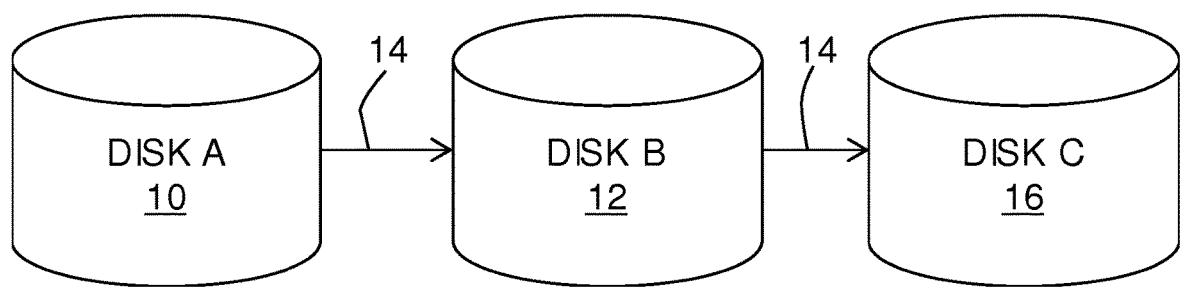
FIG. 1B is a schematic diagram showing a point-in-time copy cascade of three storage volumes, according to various embodiments.

FIG. 1B depicts an example of a point-in-time copy cascade of three storage volumes 10, 12 and 16, which are linked by point-in-time copy maps 14. Each map 14 defines a backup process from a source volume to a target volume. Disk B is providing a backup of disk A 10, and disk C 16 is also providing a backup of disk A 10, through disk B 12. The point-in-time copy functions 14 linking the different storage volumes may have been started at different times, which create different point-in-time copies of the images stored by the respective storage volumes, or could have been started simultaneously.

In the point-in-time copy cascade of A→B→C, where A 10, B 12 and C 16 are the disks in the cascade, as shown in FIG. 1B, and the arrows are the point-in-time copy maps, then denoting (A, B) to be a point-in-time copy mapping from disk A 10 to disk B 12, the cascade has maps (A, B) and (B, C). In this implementation of the cascade, any new data write to disk A 10 will cause a write that is a "copy write,"

to disk B 12, as per the respective point-in-time copy function, which is required to maintain the image on disk B 12. This writing to disk B 12 will cause a further read, often referred to as a "clean read," of disk B 12 followed by another copy write to disk C 16. In this way a single write to the first storage volume 10 in the cascade can result in a number of I/O cleaning operations throughout the cascade.

When a cascade is created, the new maps and new storage volumes are inserted into the cascade, not added to the end of the cascade. In the cascade shown in FIG. 1B, the first backup process started would be A→C. When the backup process A→B is then started, the new target storage volume B 12 is effectively "inserted" between the existing source storage volume A 10 and the existing target storage volume C 16. This "insertion" is purely a logical construction illustrating the fact that target disk C 16 will receive data writes from disk B 12, rather than disk A 10. This is how a cascaded implementation differs from a conventional arrangement, which would have two independent maps from disk A 10.

A cascade may be used to implement multiple point-in-time copies of a single data source. For example, with a data source P and point-in-time copies of P taken at times t1, t2 and t3, then at time t1 there is taken a point-in-time copy using data target T1 resulting in a cascade: P→T1. Then at time t2 there is taken a second point-in-time copy using data target T2 and resulting in the cascade: P→T2→T1. In effect, T1 is established as a copy of T2, which is at this instant identical with P, and T2 is a copy of P. A bitmap held by T2 that describes its differences from P also correctly describes its difference from T1. Updates to P only require a copy operation to copy from P to T2. Conversely, updates to T2 may require two copy operations: from P to T2, and from T2 to T1. This is because updates to the middle of a chain force a copy to the relationships on either side. Adding a third backup T3 at t3 produces the cascade: P→T3→T2→T1.

Figure 1C:
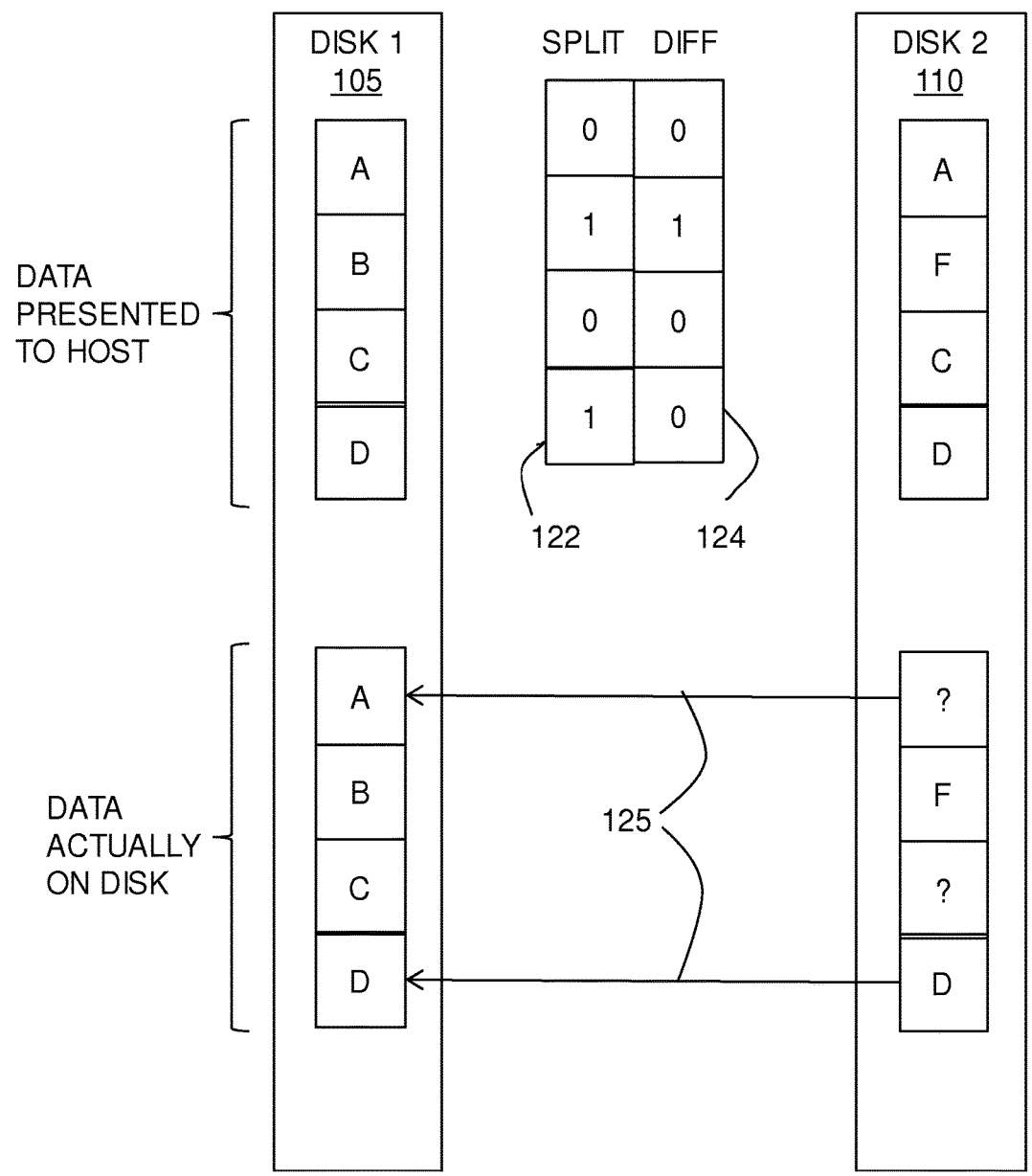
FIG. 1C is a schematic diagram showing a cascade of a map, according to various embodiments.

FIG. 1C is a schematic diagram showing a cascade of a map, according to various embodiments.

More specifically, FIG. 1C depicts representations of two disks 105, and 110. As depicted in FIG. 1C, the upper portions of the disks indicate data that is presented to, e.g., a host, from the respective disks. The disk as presented to a host is referred to as the "vdisk." A vdisk is a term used in storage virtualization to signify a virtual logical disk or volume with which a host computer or host computer application performs I/O operations. FIG. 1C also depicts the lower portions of the representations of the disks indicating the data that is actually contained on the respective disks. These lower portions of the disk are referred to as a "pdisk." The pdisk is an object that is directly connected to physical storage. The skilled person would understand that the pdisk might itself be a virtual volume sitting on a Redundant Array of Independent Disks (RAID) array(s). The skilled person would also appreciate that the storage controller 8 manages the copies at a virtual level, but that reads and writes to logical disks do result in reads and writes, respectively, to physical disks. Thus, Disk 1 105 presents four grains (or tracks) of data A, B, C, D to a user and actually has those grains A, B, C, D stored on Disk 1 105. In contrast, Disk 2 110 presents four grains of data A, F, C, D to a user. However, as shown in the bottom portion of Disk 2 110, Disk 2 110 may actually only have stored thereon grains two and four (F and D, respectively) and may rely upon data stored in Disk 1 105 to present the host with grains A and C. The fourth grain (D) is stored on Disk 2 110, even though the same data is available on Disk 1 105, due, for example a rewrite of data D onto Disk 1 105 previously.

As additionally depicted in FIG. 1C, Map 2 120 is an incremental between Disk 1 105 and Disk 2 110. That is, Map 2 120 includes a split bitmap (split) 122 and a difference bitmap (diff) 124. The split bitmap 122 is used in a point-in-time process to track the location of the data. More specifically, a "0" in the split bitmap 122 indicates that the data is located on the source disk and a "1" in the split bitmap 122 indicates that the data is located on the target disk. Furthermore, the difference bitmap 124 is used in a point-in-time copy process to track the differences between the source and target disks, e.g., virtual disks. More specifically, a "0" in the difference bitmap 421 indicates there is no difference between the data located on the source disk and the target disk, and a "1" in the difference bitmap 124 indicates that there is a difference between the data located on the source disk and the data located on the target disk.

Thus, referring to the example of FIG. 1C, the split bitmap 122 of Map 2 120 indicates that grains A and C are located on the source disk (Disk 1 105) and grains F and D are located on the target disk (Disk 2 110). Moreover, the difference bitmap 124 of Map 2 120 indicates that there is no difference between the first, third and fourth grain of the source disk (disk one 105) and the target disk (disk two 110). That is, the first, third and fourth grain remain the same between the source disk and the target disk, i.e., A, C, and D, respectively. However, the difference bitmap 124 of Map 2 120 indicates that there is a difference for the second grain between the source disk (Disk 1 105) and the target disk (Disk 2 110). That is, as shown in FIG. 1, the second grain has been changed from B on Disk 1 105 to F on Disk 2 110. Thus, pointers 125 illustrate that the target disk 110 refers to the source disk 105 based on the contents of the split bitmap 122 rather than to the physical contents of Disk 2 110.

Advantageously, the use of bitmaps 122, 124 allows the storage controller 8 to manage access to virtual and physical copies of storage disk volumes, including management of the data content when copies are added or deleted from the system. When a copy is deleted from the chain, the contents representing data updates can be "cleaned" onto another copy in the remaining chain, based on the contents of the bit maps 122, 124.

Figure 1D:
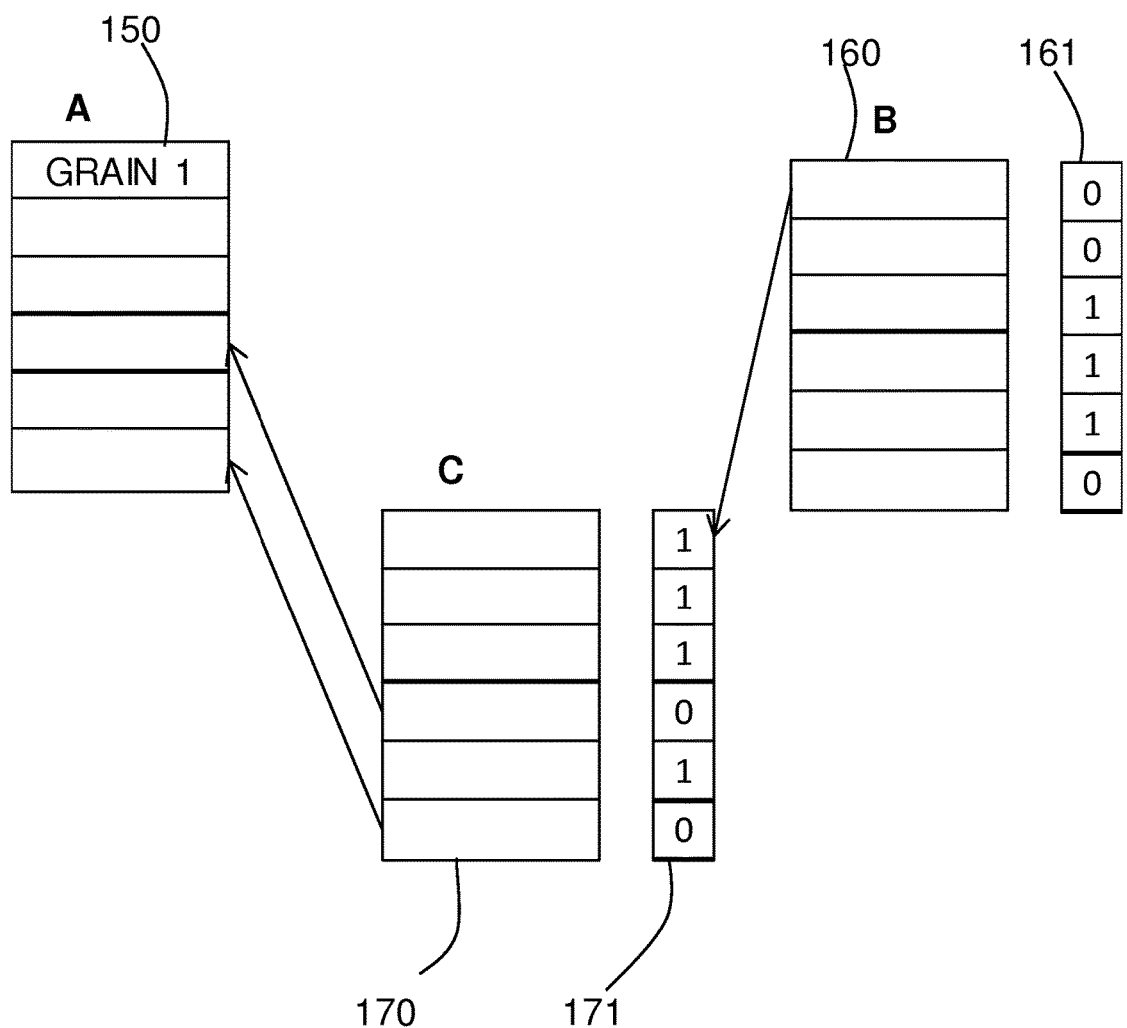
FIG. 1D is a schematic diagram showing a cascade of a map, according to various embodiments.

FIG. 1D is a schematic diagram showing a cascade of a map, according to various embodiments.

Referring to FIG. 1D, A is a source logical unit 150, and B and C show two targets 160, 170 that were taken at some time in the past, with C being more recent than B.

Suppose that A 150 and B 160 are already in a point-in-time relationship, and C 170 is added as a copy of A 150. The bitmap 161 held by B 160 that described its differences from A 150 also correctly describes its difference from C 170 as at this point C 170 is identical to A 150, and has an empty bitmap 171.

Updates to A 150 may require a copy operation to copy data from A 150 to C 170. Conversely, updates to C 170 may require two copy operations, from A to C, and from C to B. This is because updates to the middle of a chain force a copy to the relationships on either side.

The bitmap 161 at B 160 and the bitmap 171 at C 170 may be updated to indicate the data mappings and track the progress of each point-in-time copy.

In the currently described methods and systems, a volume with a cascade of snapshots forms a chain that may be required to be cloned. When a volume with a chain of snapshots is to be cloned, the chain is mirrored and a cloned chain is created. Repeating the process adds a new chain between the source chain and previous chain and, in this way, a lattice may be constructed.

Figure 2:
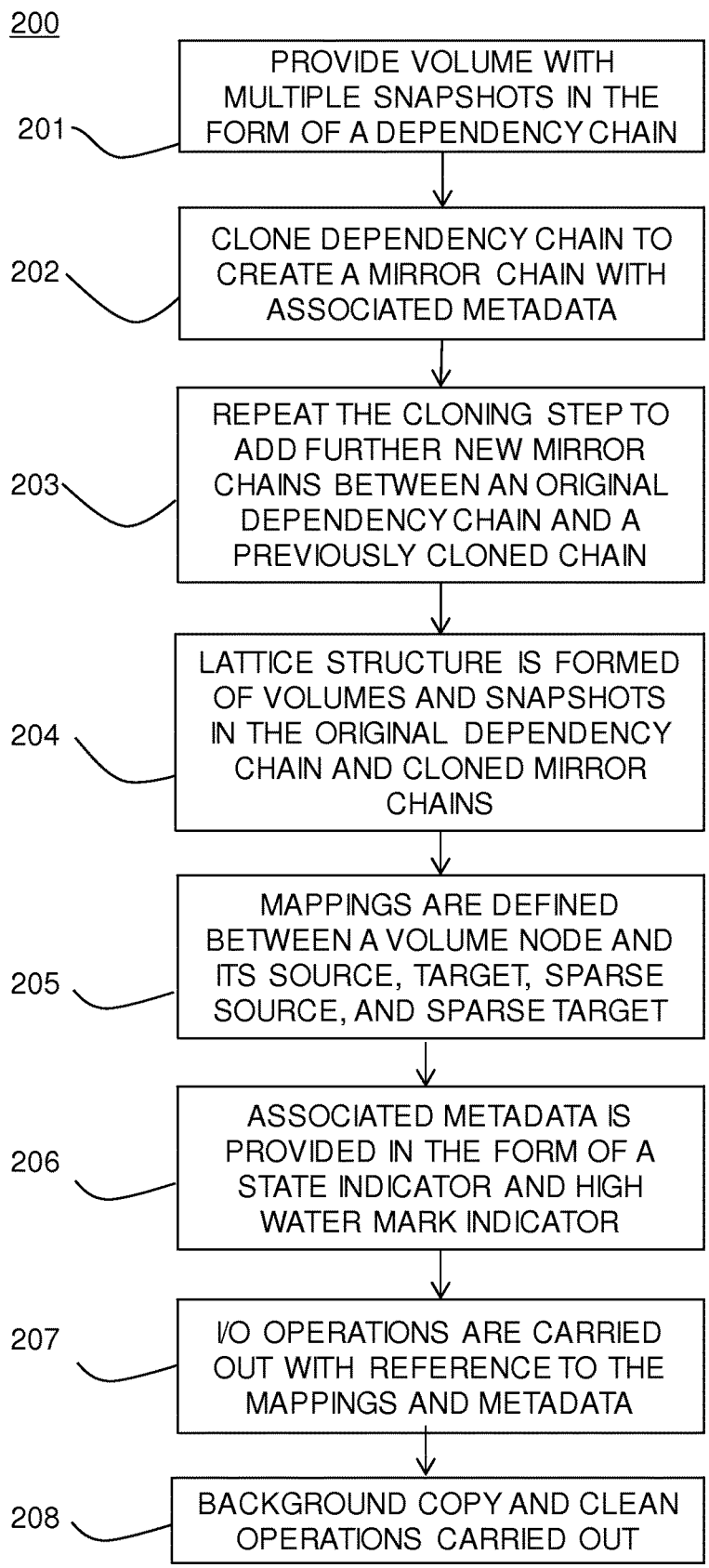
FIG. 2 is a flow diagram of an example embodiment of a method, according to various embodiments.

FIG. 2 is a flow diagram 200 of an example embodiment of a method, according to various embodiments.

A method for storage copy with chain cloning is described, which provides 201 a volume with multiple snapshots in the form of a dependency chain or cascade.

The dependency chain of the volume and its snapshots may be instantly cloned to create 202 a mirror chain including the volume, multiple snapshots and associated mappings and metadata required to maintain the snapshots.

Repeating 203 the cloning step to add a new mirror chain, adds the new mirror chain between the original volume dependency chain and a previous cloned mirror chain. The repeating 203 of cloning may take place multiple times, as may be required.

The cloning may create 204 a lattice structure or representation of volumes and snapshots of the original dependency chain and cloned mirror chains. The lattice structure may be a virtual structure in that it is not a physical arrangement of the volumes and snapshots but a representative arrangement. The lattice structure may be represented having normal chain operations in a first direction and the mirrored copy chains in a second, perpendicular direction to the first direction. The mirrored chains are referred to as sparse copy chains. A sparse copy is a copy of the data that physically resides on a snapshot rather than the entire logical image of the snapshot.

A volume node is defined as any of the volume, snapshots, sparse copy volume, and sparse copy snapshots. Each volume node has associated mappings 205 defined for a source in the dependency chain, a target in the dependency chain, a sparse copy source, and a sparse copy target.

Each volume node has associated metadata 206 to ensure mappings to a correct source or target in the lattice when carrying out operations. The metadata is in the form of a target state and a high water mark statement. The target state for each volume node indicates if the data is on the target volume node. The target state may be provided as a bitmap and this metadata is referenced as ".BIT" herein. A high water mark is metadata that indicates whether the sparse copy process has considered that region of the disk. The high water mark is used to indicate which of the chains to go to. The high water mark may be provided as a bitmap if there is only one grain of disk. For a multi grain disk the high water mark statement would be an inequality. The high water mark statement metadata is referenced as ".HWM" herein. The metadata may additionally include an indication of a head of a sparse chain referred to as "SparseHead," which is used for background copy and clean operations.

Input and output operations 207 of read and writes to the volume nodes are carried out with reference to the mappings and metadata. In addition, background copy and clean operations are carried out 208 to maintain the mappings and metadata of the volume nodes.

The method maintains images presented by the volume nodes in the lattice while matching the space used by each snapshot and its clones. This may be achieved without limiting the I/O access to any volume in the lattice.

Figure 3A:
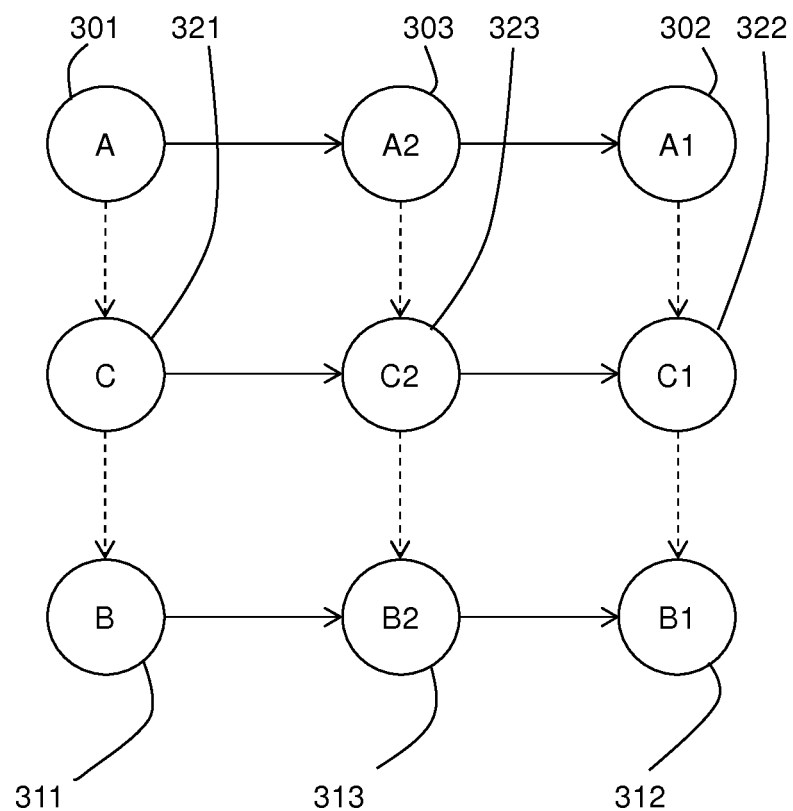
FIG. 3A is a schematic diagram showing an example lattice structure, according to various embodiments.

FIG. 3A is a schematic diagram showing an example lattice structure, according to various embodiments.

Referring to FIG. 3A, suppose there is a volume A 301 with two snapshots A1 302 and A2 303. If the chain is cloned onto a chain B 311 and then later onto a chain C 321, there would be a lattice as shown in FIG. 3A.

The 'normal' dependency chain is shown as horizontal, such as from A 301 to A2 303 to A1 302. The chains used for the chain clone are shown as vertical, such as from A 301 to C 321 to B 311, from A2 303 to C2 323 to B2 313, and from A1 302 to C1 322 to B1 312. The vertical chains are referred to as sparse copy chains. A sparse copy is a copy of the data that physically resides on a snapshot rather than the entire logical image of the snapshot.

By using bitmaps to define whether the data is on a target volume node and an additional high water mark, this solution describes how the images presented by all the volumes in a lattice may be maintained.

Multiple chain clones may be performed at once resulting in the example lattice structure with sparse copy chains vertically and directed downwards and normal chain operations horizontal.

Figure 3B:
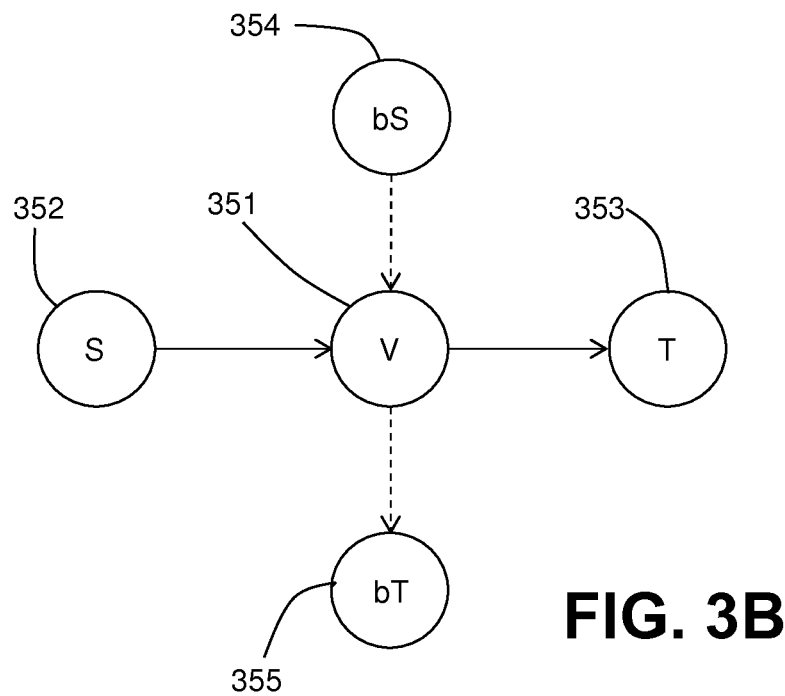
FIG. 3B is a schematic diagram showing a mapping for a volume, according to various embodiments.

FIG. 3B is a schematic diagram showing a mapping for a volume, according to various embodiments. The basic unit of operation is the structure shown in FIG. 3B.

A volume V 351 is a volume in the lattice with S 352 being the Source in the normal dependency chain, and T 353 being the Target in the normal dependency chain. A sparse copy source bS 354 is shown and a sparse copy target bT 355. So the basic unit or map has form Map(V)=(S,T,bS, BT).

In the example lattice, the maps as defined above are:
1. Map(A)=(Null, A2, Null, C)
2. Map(C)=(Null, C2, A, B)
3. Map(B)=(Null, B2, C, Null)
4. Map(A2)=(A, A1, Null, C2)
5. Map(C2)=(C, C1, A2, B2)
6. Map(B2)=(B, B1, C2, Null)
7. Map(A1)=(A2, Null, Null, C1)
8. Map(C1)=(C2, Null, A1, B1)
9. Map(B1)=(B2, Null, C1, Null)

Figure 3C:
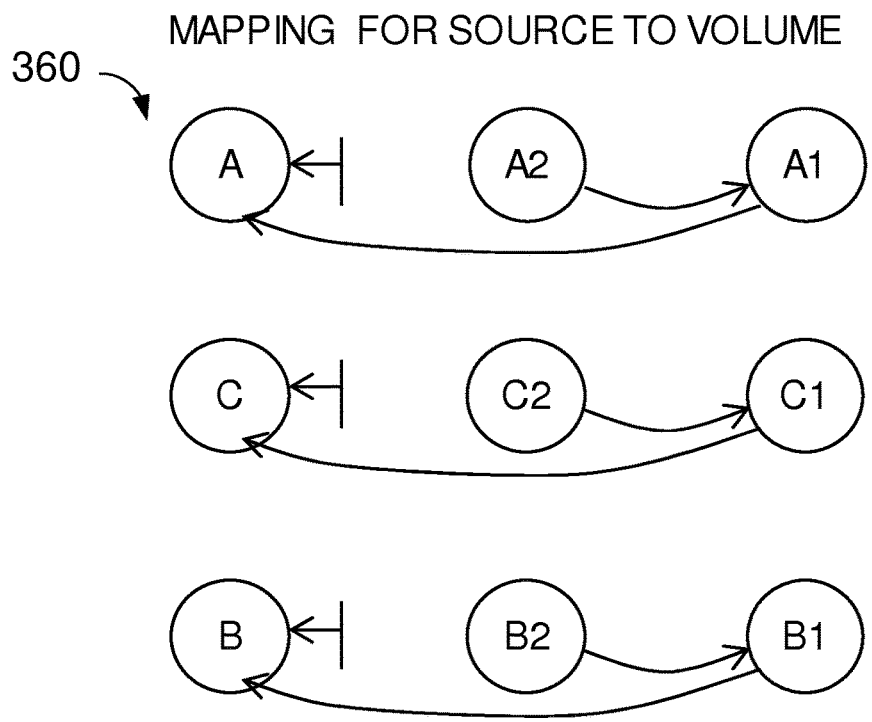
FIGS. 3C to 3F are schematic diagrams showing mappings for a volume, according to various embodiments.
Figure 3D:
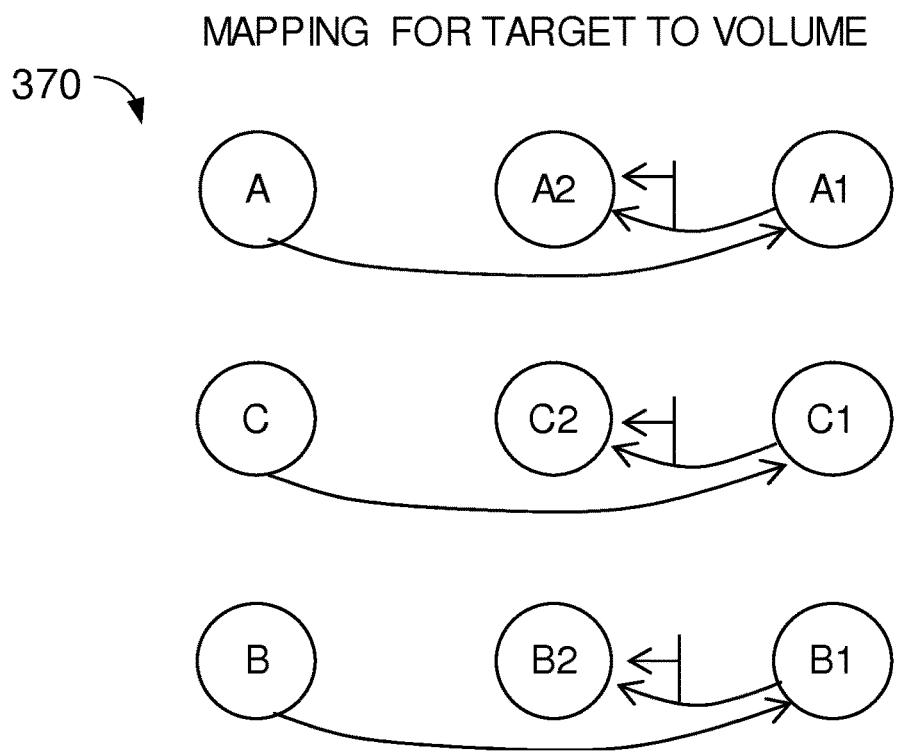

The above mappings are shown in FIGS. 3C to 3F. FIG. 3C shows the mappings for the source to the volumes 360 that are along the horizontal chains of the lattice. FIG. 3D shows the mappings for the target to the volumes 370 that are along the horizontal chains of the lattice.

Figure 3E:
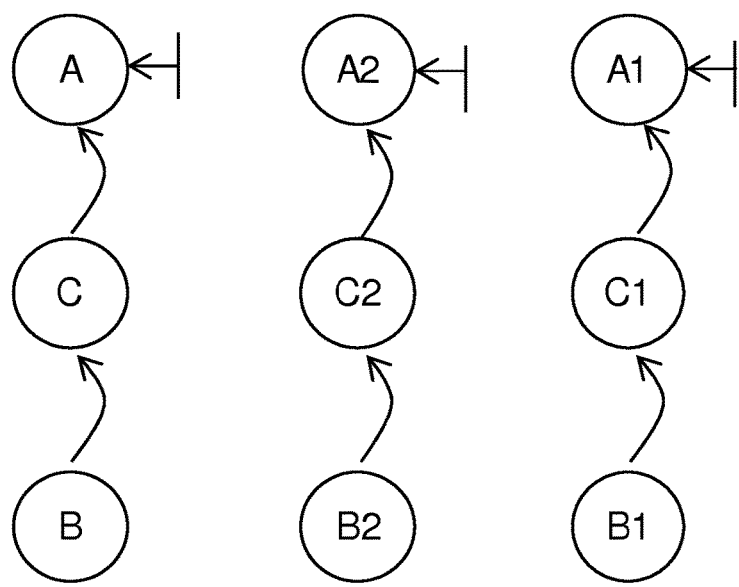
Figure 3F:
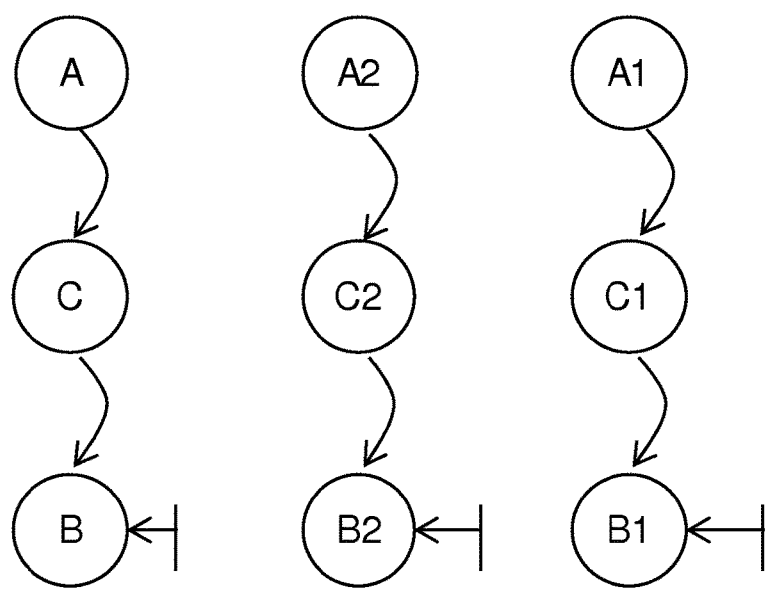

FIG. 3E shows the mappings for a sparse source to the volumes 380 which are along the vertical chains of the lattice. FIG. 3F shows the mappings for a sparse target to the volumes 390 that are along the vertical chains of the lattice.

The I/O operations are modified while the volume is part of a sparse chain. When a volume V has a sparse source volume, the metadata is provided and interpreted as:
1. A split bitmap which indicates whether a logical block address (LBA) is on the target or not.
2. A high water mark that indicates whether to read the sparse chain (or which sparse chain to read) or the normal chain.

This means that if a bit in the split bitmap is set then the data is on the target volume. If the data is not on the target volume, the high water mark indicates at which chain to look.

There are multiple high water marks in the lattice, in our example there will be high water marks between A and C, C and B, A2 and C2, C2 and B2, A1 and C1 and finally C1 and B1. In general as the sparse copy progresses the high water mark will increase to indicate that different regions of the physical disk have been copied if necessary and therefore changing the decision for future I/O.

In the following examples, it is assumed that each volume has only one grain. This assumption can be made without loss of generality because all grains are independent of each other. In addition, all writes are assumed to be full grain writes, according to various embodiments. It may be simple to extend this algorithm to partial grain writes but this clouds the basic algorithm with details that are unnecessary at this stage.

For a multi-grain disk the high water mark statement would be an inequality. For example, if there is a 3 grain disk (grains 0 to 2) and if querying the high water mark at the 1 grain the query would be is HWM<1. Similarly, if querying the bitmap at grain 2, the query would consider whether the 2nd bit was set or not.

In the following example algorithms, the following attributes are used of a map, Map(V)=(S, T, bS, bT):

1. Map(V).HWM refers to the high water mark between volumes Map.bS and V. This could be a bitmap or an actual high water mark. Since only 1 grain is assumed in this explanation, a bitmap can be assumed.
If Map(V).bS=Null then HWM returns TRUE.
2. Map(V).BIT represents the contents of the bitmap between volumes Map.S and V.
This returns True if the bit is set, False otherwise.
If Map(V).S=Null then BIT returns TRUE.
3. Read(V) means read the contents of volume V.
4. Write(V,d) means write d to volume V.
5. Empty(X) is True if X=Null, False otherwise.

The mapping and metadata stored for a volume V may include:
Mapping Map(V)=(S,T,bS,bT), the elements of which may be written as:
Map(V).S
Map(V).T
Map(V).bS
Map(V).bT Split Bitmap—if the 'data' is on the target no the mapping on the target, including the following:
Map(V).BIT—between volumes source (Map.S) and V for lattice read operations;
Map(Map(V).T).BIT—between volumes target (Map.T) and V for lattice write operations;
Map(Map(V).bT).BIT—between volumes sparse target (Map.bT) and V for lattice write operations;
Map(Map(Map(V).T).bS).BIT—for lattice clean operations; and
Map(SparseHead(V)).BIT—to return head of sparse chain for lattice copy operations.

High Water Mark—indicating which sparse chain or normal chain to use, including:
Map(V).HWM—between volumes sparse source (Map.bS) and V for lattice read operations;
Map(Map(V).T).HWM—between volumes target (Map.T) and V for lattice write operations;
Map(Map(V).bT).HWM—between volumes sparse target (Map.bT) and V for lattice write operations.

Read Algorithm

When a host submits a read to a volume in the lattice, a read algorithm is used, which is referred to as a lattice read, or lread. So the algorithm for a read of volume V becomes, lread(V) defined by:
if (empty(Map(V).S) ∧ empty(Map(V).bS)) then
  read(V)
if (~empty(Map(V).S) ∧ empty(Map(V).bS)) then
  if Map(V).BIT then
    read(V)
  else
    lread(Map(V).S)
if (empty(Map(V).S) ∧ ~empty(Map(V).bS)) then
  if Map(V).BIT ∨ Map(V).HWM then
    read(V)
  else
    lread(Map(V).bS)
if (~empty(Map(V).S) ∧ ~empty(Map(V).bS)) then
  if Map(V).BIT then
    read(V)
  else if Map(V).HWM then
    lread(Map(V).S)
  else
    lread(Map(V).bS)

Write Algorithm

When a host submits a write to a volume in the lattice, a write algorithm is used, which is referred to as a lattice write, or lwrite. The algorithm for a write to volume V of data x becomes, lwrite(V,x) defined by:
if empty(Map(V).bS) then
  if ~empty(Map(V).T) ∧ (~Map(Map(V).T).BIT) then
    write(Map(V).T, lread(V)
    Map(Map(V).T).BIT=True
  if ~empty(Map(V).bT) ∧ (~Map(Map(V).bT).BIT ∧ ~Map(Map(V).bT).HWM) then
    write(Map(V).bT, lread(V)
    Map(Map(V).bT).BIT=True
else
  if ~empty(Map(V).T) ∧ (~Map(Map(V).T).BIT)
    if Map(Map(V).T).HWM ∨ (~Map(Map(Map(V).T).bS).BIT) then
      write(Map(V).T, lread(Map(V).T))
      Map(Map(V).T).BIT=True,
  if ~empty(Map(V).bT) ∧ ~(Map(Map(V).bT).HWM)
    write(Map(V).bT, lread(Map(V).bT))
    Map(Map(V).bT).BIT=True
write(V,x)
if (~empty(Map(V).S) ∨ ~empty(Map(V).bS)
  Map(V).BIT=True Background Copy Algorithm In order to define the background copy algorithm, some notation may first be introduced. A function is needed that returns the head of that sparse chain, sparseHead(V). In FIG. 3A, this could be:
sparseHead(B)=sparseHead(C)=sparseHead(A)=A
sparseHead(B2)=sparseHead(C2)=sparseHead(A2)=A2
sparseHead(B1)=sparseHead(C1)=sparseHead(A1)=A1
With this function, the algorithm, lattice copy or lcopy, is
if (~empty(Map(V).bS)) ∧ (~Map(V).HWM) ∧ (~Map(V).BIT) then
  if empty(Map(sparseHead(V)).S) ∨ Map(sparseHead(V)).BIT
    write(V, lread(V))
    Map(V).BIT=True
    Map(V).HWM=True Clean Algorithm The lattice clean algorithm or lclean ensures grains are not depended on by any other target volumes. The lclean algorithm is
if ~empty(Map(V).bT) then
  if Map(V).BIT ∧ ~(Map(V).bT).HWM ∧ ~(Map(V).bT).BIT then
    write(Map(V).bT, read(V))
    Map(Map(V).bT).BIT=True
  if ~empty(Map(V).T ∧ ~Map(Map(V).T).BIT then
    if Map(Map(V).T).HWM) then
      if Map(V).BIT then
        write(Map(V).T, lread(Map(V).T)
        Map(Map(V).T).BIT=True
      else
        if ~Map(V).HWM ∧ Map(sparseHead(V)).BIT) then
          write(Map(V).T,lread(Map(V).T)
          Map(Map(V).T).BIT=True With these algorithms, chains of volumes and their snapshots can be cloned in a copy-on-write environment that employs the cascading approach in order to maintain source volume I/O performance expectations.

From these algorithms, a person skilled in the art can handle intermediate non-cloned chain elements. There may be volumes in a chain that are not required in the clone of this chain.

Stopping of snapshots in the lattice before the sparse copy process is complete may also be handled.

The primary volume may also be restored before the sparse copy process is complete.

Figure 4A:
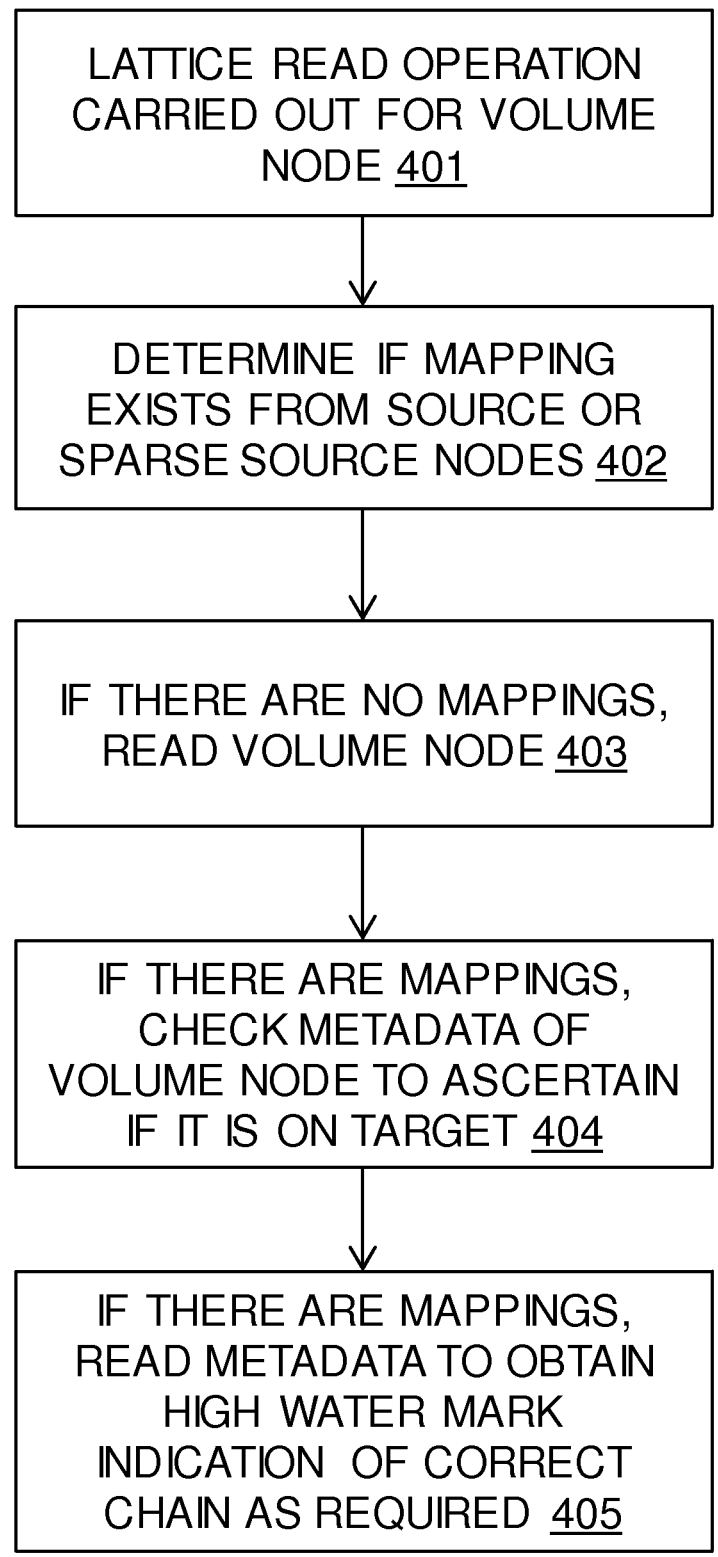
FIGS. 4A and 4B are flow diagrams of a read operation, according to various embodiments.

Referring to FIG. 4A, a flow diagram 400 illustrates a read operation, according to various embodiments.

A lattice read operation is carried out 401 for a volume node. It may be determined 402 if there is a mapping from source or sparse source nodes to the required volume node. If there are no mappings, the volume node may be read 403.

However, if there are mappings, the metadata of the volume node may be read 404 to ascertain if the volume node is on target by reading the split bitmap. The metadata may also indicate that a high water mark of the metadata may be read 405 to ascertain the correct chain to read, as may be required.

Figure 4B:
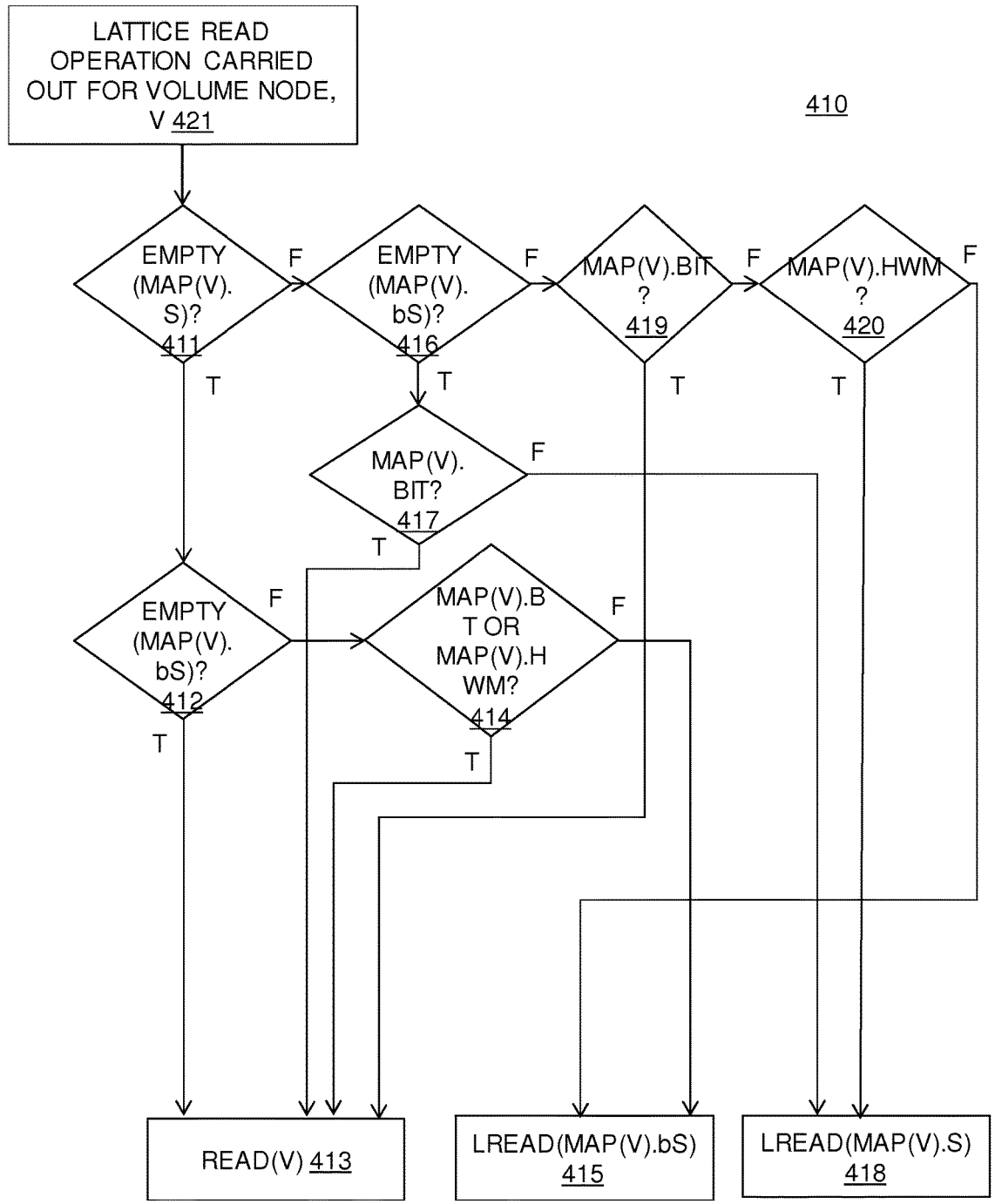

Referring to FIG. 4B, a flow diagram 410 illustrates a detailed example embodiment of a read operation according to the lattice read algorithm given above and using the notation introduced above.

A lattice read operation is carried out for volume V, 421. It is determined 411 if Empty(Map(V).S) is true. If so, there is no mapping from a source to the volume. It is then determined 412 if Empty(Map(V).bS) is true. If so, there is no mapping from a sparse source to the volume. The volume is therefore read 413, read(V).

If it is determined at 412 that Empty(Map(V).bS) is false, then the bitmap and the high water mark for Map(V).BIT are checked 414 and if either are true then the volume is read 413, read(V). If either are not true, then a lattice read of the mapped sparse source is read 415, lread(Map(V).bS).

If it is determined at 411 that Empty(Map(V).S) is false, it is then determined 416 if Empty(Map(V).bS) is true. If so the bitmap for Map(V).BIT is checked 417 and, if true, the read is on target and reads the volume 413, read(V). If the bitmap for Map(V).BIT 417 is not true, then a lattice read of the mapped source is read 418, lread(Map(V).S).

If it is determined at 411 that Empty(Map(V).S) is false, and it is then determined 416 that Empty(Map(V).bS) is false, the bitmap for Map(V).BIT is checked 419 and, if true, the read is on target and reads the volume 413, read(V).

If it is determined at 411 that Empty(Map(V).S) is false, and it is then determined 416 that Empty(Map(V).bS) is false, the bitmap for Map(V).BIT is checked 419 and, if false, the read is not on target and the high water mark for Map(V).HWM is checked 420 and, if true, lattice reads the mapped source 418, lread(Map(V).S). If the Map(V).HWM is false the method lattice reads the mapped sparse source 415, lread(Map(V).bS).

Figure 5A:
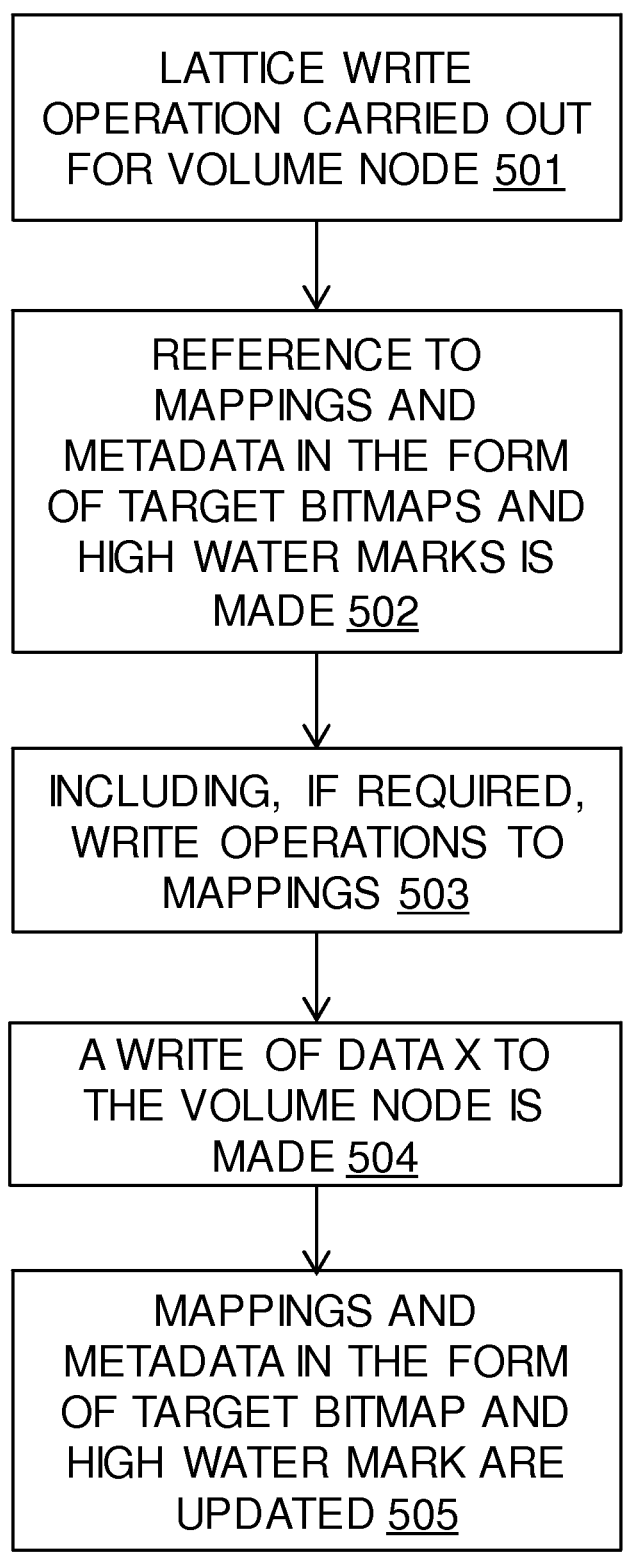
FIGS. 5A to 5C are flow diagrams of examples of a write operation of a method, according to various embodiments.

Referring to FIG. 5A, a flow diagram 500 illustrates an example of a write operation, according to various embodiments.

A lattice write operation is carried out 501 for a volume node. Reference 502 to mappings and metadata in the form of the target bitmap and the high water mark is made as may be required. This may include, if required, write operations 503 to mappings. The mappings and the metadata in the form of the target bitmap and high water mark are updated 505.

Figure 5B:
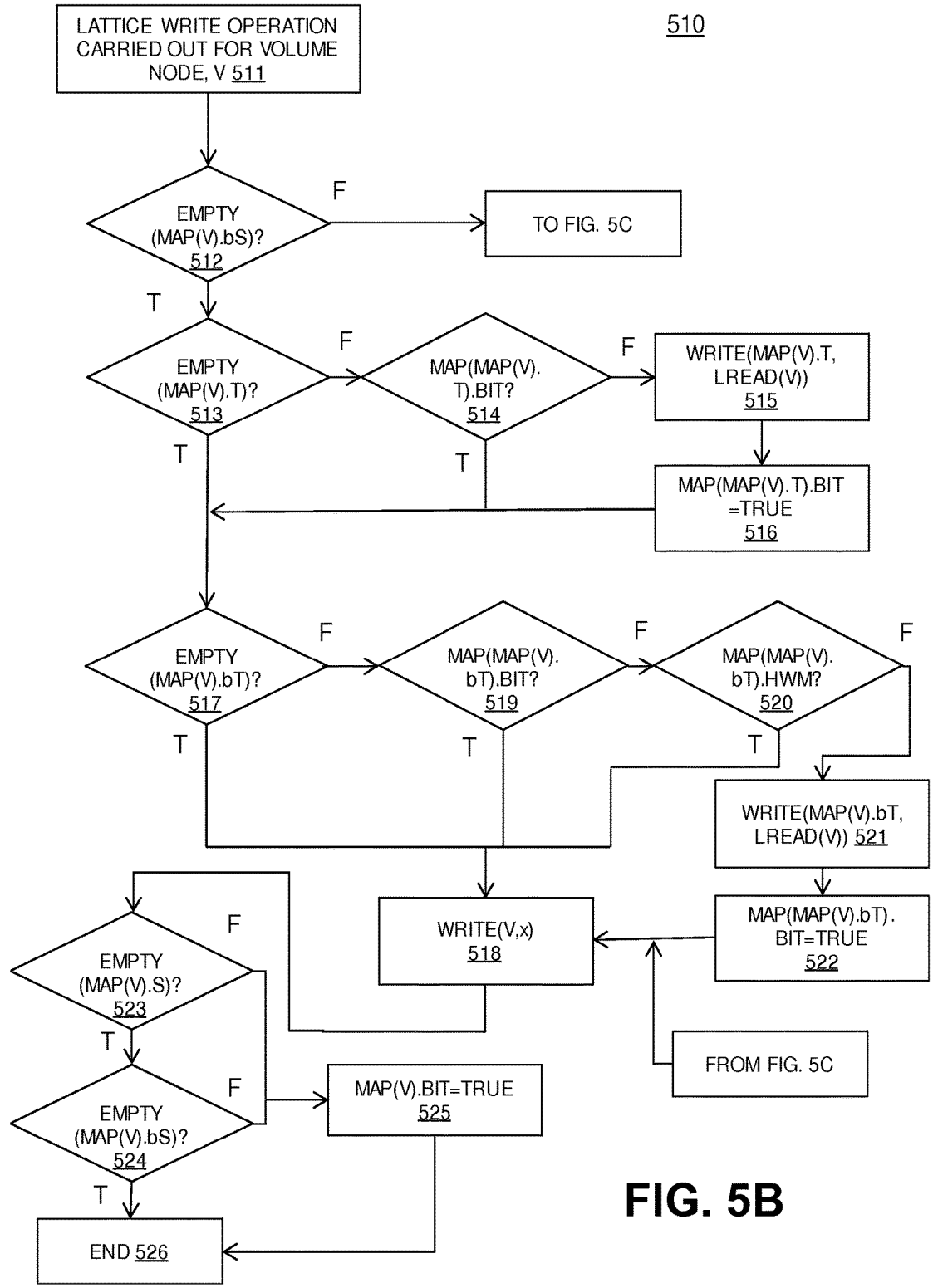
Figure 5C:
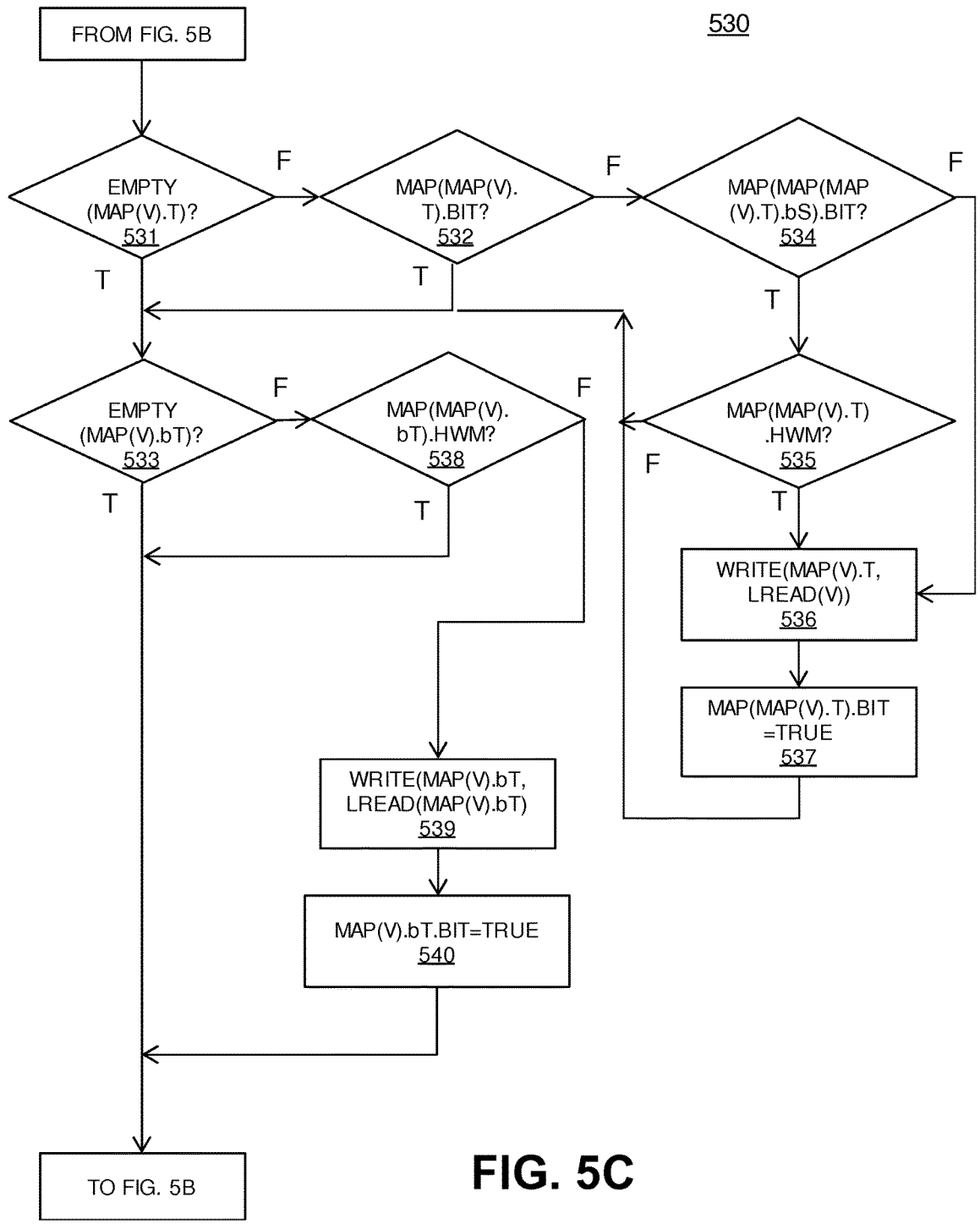

Referring to FIGS. 5B and 5C, flow diagram 510 and 530 illustrate a detailed example embodiment of a write operation according to the lattice write algorithm given above and using the notation introduced above.

A lattice write operation is carried out 511 for volume node, V to write x. It may be determined 512 whether Empty(Map(V).bS) is true. If it is false, the method goes to FIG. 5C described below.

If it is determined 512 that Empty(Map(V).bS) is true, then may be determined 513 whether Empty(Map(V).T) is true. If Empty(Map(V).bT) is false, then it is determined 514 if Map(Map(V).T).BIT is true. If it is true, the method loops to step 517, but if it is false, then a write operation may be carried out 515 of Write(Map(V).T,lread(V)). If Map(Map(V).T).BIT is set 516 to true, the method may loop to step 517.

At step 517, it may be determined if Empty(Map(V).bT) is true. If Empty(Map(V).bT) at 517 is true, the method writes x to the volume node V 518, Write(V,x). If Empty(Map(V).bT) at 517 is false, it is determined 519 if Map(Map(V).bT).BIT is true. If Map(Map(V).bT).BIT at 519 is true, the method writes x to the volume node V 518, Write(V,x). If Map(Map(V).bT).BIT at 519 is false, it is determined 520 if Map(Map(V).bT).HWM is true. If Map(Map(V).bT).HWM at 520 is true, the method writes x to the volume node V 518, Write(V,x). If Map(Map(V).bT).HWM at 520 is false, then a write operation is carried out 521 of Write(Map(V).bT,lread(V)) and Map(Map(V).bT).BIT is set 522 and then the method loops to writes x to the volume node V 518, Write(V,x).

Once Write(V,x) is carried out at 518, it is determined 523 if Empty(Map(V).S) is true. If it is true it is determined 524 if Empty(Map(V).bS) is true. If 524 is true, the method ends 526. If either 523 or 524 are false, then Map(V).BIT is set 525 to true and then the method ends 526.

Referring to FIG. 5C, flow diagram 530 shows the method within FIG. 5B, which is carried out when it is determined at 512 that Empty(Map(V).bS) is false.

It is determined 531 if Empty(Map(V).T) is true. If it is false, it is determined 532 if Map(Map(V).T).BIT is true. If it is true, the method loops to step 533. If it is false, it is determined 534 if Map(Map(Map(V).T).bS).HWM is true. If 534 is true it is determined 535 if Map(Map(V).T).HWM is true. If 535 is true or 534 is false then a write operation is carried out 536 to Write(Map(V).T,lread(V)) and set 537 Map(Map(V).T).BIT to true. If 535 is false, the method proceeds to step 533.

If at 531 Empty (Map(V).T) is true, or at 532 Map(Map(V).T).BIT is true, or after step 537, the method proceeds to step 533.

Step 533 determines if Empty(Map(V).bT) is true. If it is true, the method proceeds to FIG. 5B. If Empty(Map(V).bT) is false, it is determined 538 if Map(Map(V).bT).HWM is true, if so the method loops to FIG. 5B. If 538 is false, a write operation is carried out 539 to Write(Map(V).bT,lread (Map(V).bT) and set 540 Map(Map(V).bT).BIT to true. The method then loops to FIG. 5B.

Figure 6A:
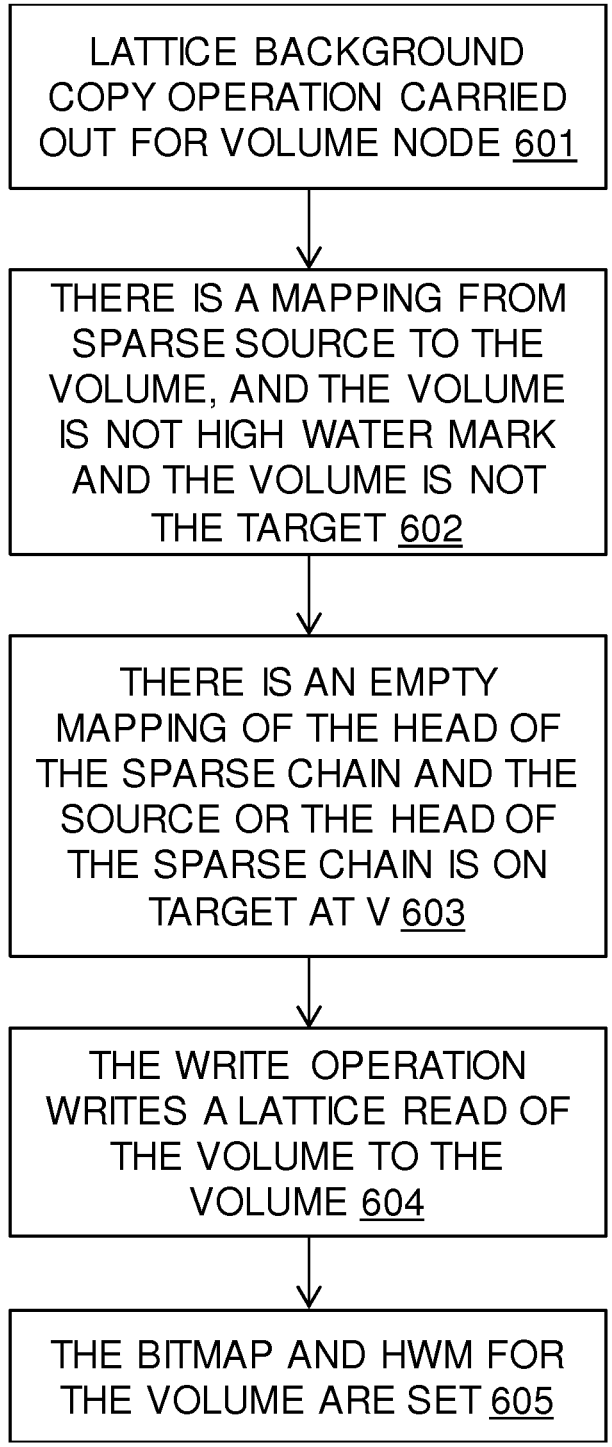
FIGS. 6A and 6B are flow diagrams of a copy operation of a method, according to various embodiments.

Referring to FIG. 6A, a flow diagram 600 illustrates a generalized example of a copy operation, according to various embodiments.

A lattice background copy operation may be carried out 601 for the volume node.

If there is a mapping 602 from a sparse source to the volume and the volume is not the high water mark and the volume is not the target, the next step is taken.

If there is an empty mapping 603 of the head of the sparse chain and the source or the mean of the sparse chain is on target at the volume, the next step is taken.

A write operation 604 writes a lattice read of the volume to the volume. The bitmap and the high water mark are set 605 for the volume.

Figure 6B:
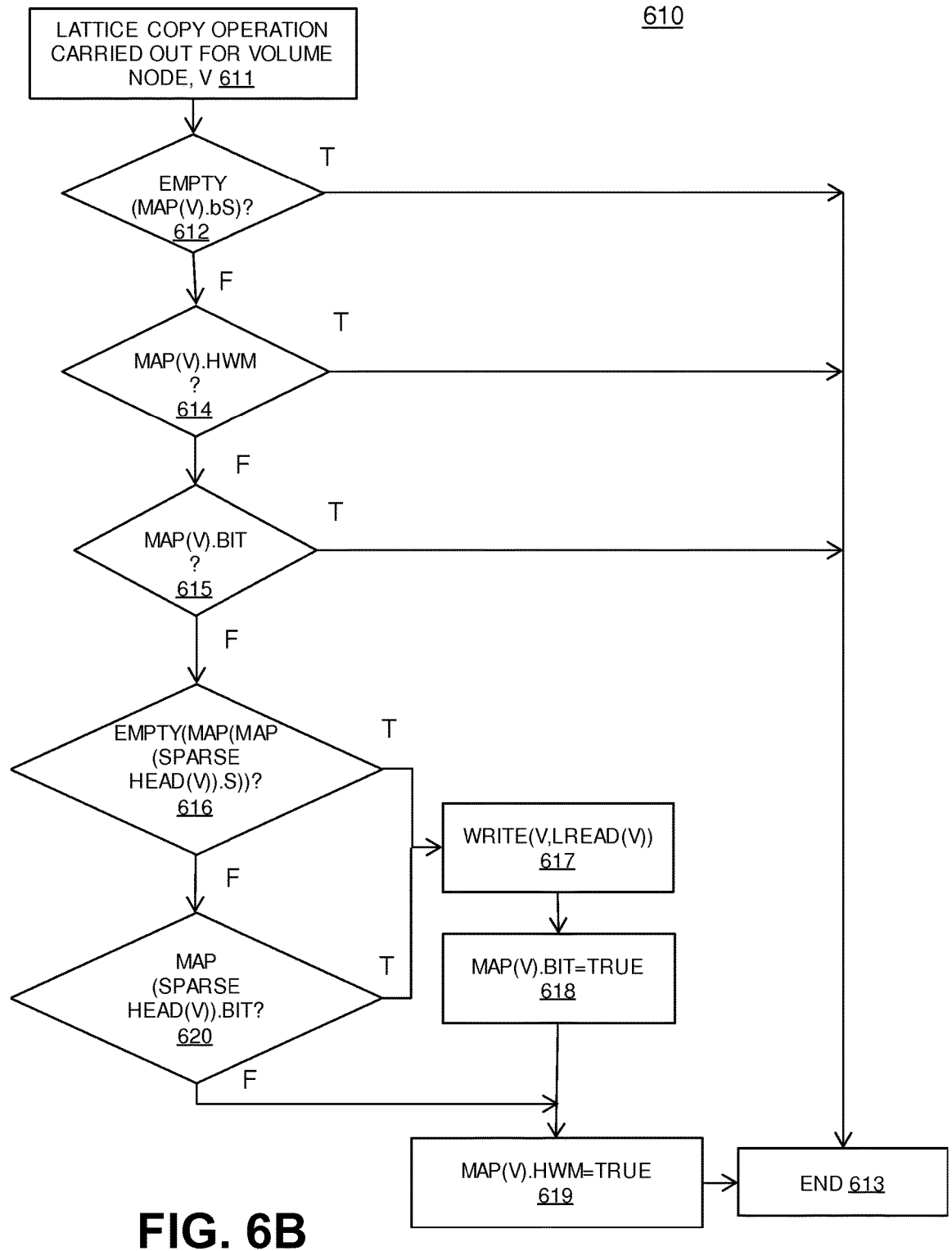

Referring to FIG. 6B, a flow diagram 610 illustrates a detailed example embodiment of a background copy operation according to the lattice copy algorithm given above and using the notation introduced, above.

A lattice copy operation may be carried out 611 for volume V.

It is determined 612 if Empty(Map(V).bS) is true, if so the method ends 613. If Empty(Map(V).bS) is false, it is determined 614 if Map(V).HWM is true, if so the method ends 613. If Map(V).HWM is false, it is determined 615 if Map(V).BIT is true, if so the method ends 613.

If Map(V).BIT is false, it is determined 616 if Empty (Map(Map(SparseHead(V)).S) is true. This determines if there is no mapping to the head of the sparse chain. If so, a write is made 617 of lread(V) to the volume V, Write(V,lread (V)). In addition, the Map(V).BIT is set to true 618 and the Map(V).HWM is set to true 619, and the method ends 613.

If it is determined at 616 that Empty(Map(Map(SparseHead(V)).S) is false, it is determined 620 if Map(SparseHead (V)).BIT is true. If so, a write is made 617 of lread(V) to the volume V, Write(V,lread(V)). In addition, the Map(V).BIT is set to true 618 and the Map(V).HWM is set to true 619, and the method ends 613.

If it is determined at 620 that Map(SparseHead(V)).BIT is false, the Map(V).BIT is set to true 619 and the method ends 613.

Figure 7A:
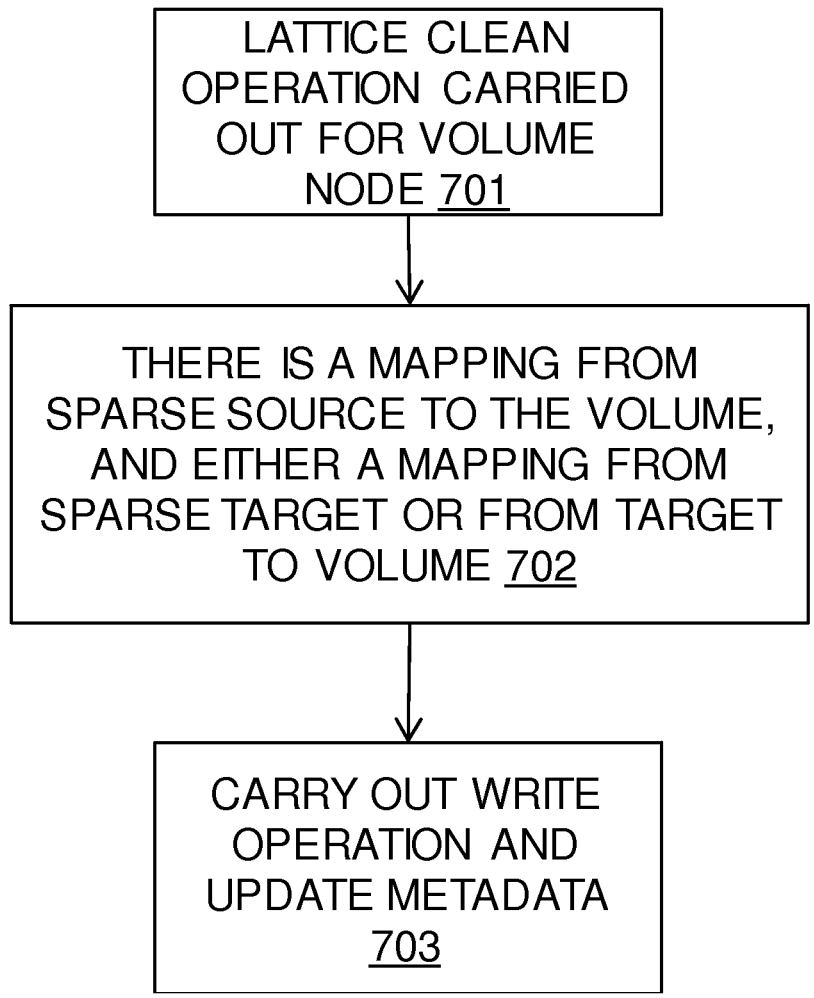

Referring to FIG. 7A, a flow diagram 700 illustrates a clean operation of a method, according to various embodiments.

A lattice clean operation is carried out 701 for a volume node. If there is a mapping from sparse source node to the volume node and either a mapping from the sparse target or from the target node to the volume node, then a clean operation is required 702. The clean operation involves a write operation and update of the metadata 703.

Referring to FIG. 7B, a flow diagram 720 illustrates a more detailed example embodiment of a clean operation according to the lattice clean algorithm given above and using the notation introduced above.

A lattice clean operation may be carried out for volume node V 721. It may be determined 722 whether Empty(Map (V).bT) is true. If it is true, it is determined 723 whether Empty(Map(V).T) is true. If so, the method ends 723 as no clean up is required.

If it is determined 722 that Empty(Map(V).bT) is false, then it is determined 733 if Map(V).BIT is true. If Map(V).BIT is false at 733, the method loops to the next step of 723. If Map(V).BIT is true at 733, it is determined 734 if (Map(V).bT).HWM is true and, if so, the method loops to the next step of 723. If Map(V).bT).HWM is false at 734, then it is determined 735 if (Map(V).bT).BIT is true and, if so, the method loops to the next step of 723. If (Map(V).bT).BIT is false at 735, then the method carries out a write 736 of Write(Map(V).bT, lread(V)) and sets 737 Map(Map(V).bT).BIT to true. The method then loops to the next step of 723.

If it is determined 722 that Empty(Map(V).bT) is true but it is determined 723 that Empty(Map(V).T) is false, then the method proceeds to step 726. If it is determined 723 that Empty(Map(V).T) is true, then the method ends at 724.

At step 726 it is determined if Map(Map(V).T).BIT is true. If it is true, then the method ends 724.

If it is determined 726 that Map(Map(V).T).BIT is false, then it is determined 727 if Map(Map(V).T).HWM is false. If it is false, then the method ends 724.

However, if the high water mark is true, then it is determined 728 whether Map(V).BIT is true. If it is true then a write operation is carried out 729 of Write(Map(V).T,lread (Map(V).T)). At step 730, Map(Map(V).T).BIT is set to true, and the method ends 724.

If at 728 Map(V).BIT is false, it is determined 731 whether Map(V).HWM is true and, if so, the method ends 724. If Map(V).HWM is false, it is determined 732 if Map(SparseHead(V)).BIT is true indicating that the node is the head of the sparse chain. If true, the method continues to write 729 and 730, if false the method ends 724.

Figure 8:
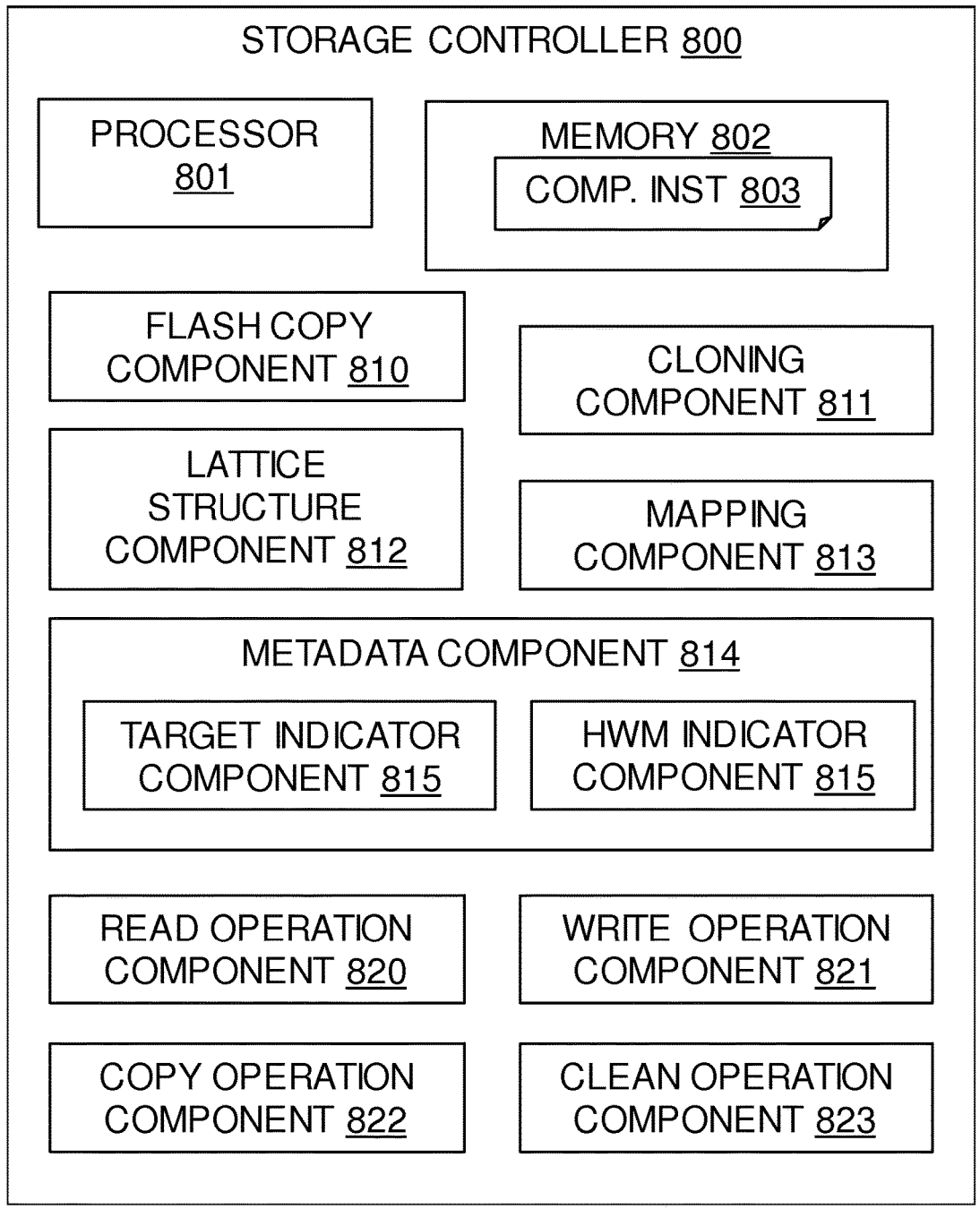
FIG. 8 is block diagram of a system, according to various embodiments.

FIG. 8 is block diagram of a system, according to various embodiments. The block diagram illustrates an example embodiment of a storage controller 800 including the described functionality.

The storage controller may include at least one at least one processor 801, a hardware module, or a circuit for executing the functions of the described components which may be software units executing on the at least one processor. Memory 802 may be configured to provide computer instructions 803 to the at least one processor 801 to carry out the functionality of the components.

The storage controller 800 may include a flash copy component 810 for creating flash copy images of a volume node.

A cloning component 811 may be provided for cloning a volume and its snapshots to create a mirror chain including any associated metadata required to maintain the snapshots. The cloning component 811 may create multiple clones.

A lattice structure component 812 may be provided for structuring a lattice of volumes and snapshots of an original dependency chain and cloned mirror chains.

A mapping component 813 may maintain mappings between the nodes of the lattice structure. A metadata component 814 may maintain and read metadata associated with the volume nodes in the lattice structure. The metadata component 814 may include a target indicator component 815 and a high water mark metadata component 816.

A read operation component 821 may be provided for carrying out lattice read operations. A write operation component 822 may be provided for carrying out lattice write operations. A copy operation component 823 may be provided for carrying out lattice copy operations. A clean operation component 824 may be provided for carrying out lattice clean operations.

An instant virtual copy instruction starts the instant virtual copy process, which may create a map from a source volume to a target volume. The image of the source volume at this specific point in time may now available on the target volume. This creates a backup of the data on the source volume, and also allows tests and other administration tasks to be run on the data of the source volume, without the attendant danger of losing any of the original data.

Figure 9:
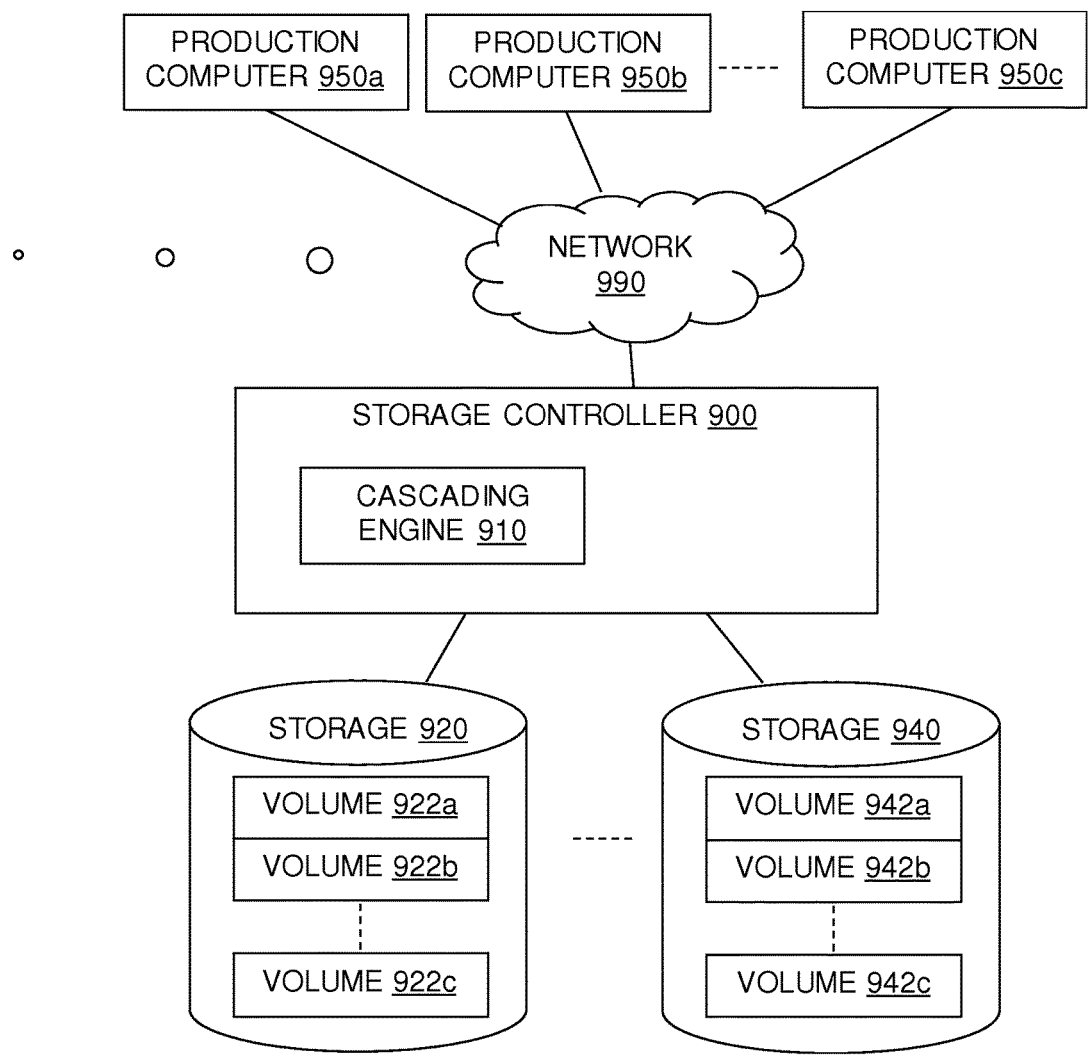
FIG. 9 is a block diagram of a storage system in a computing environment, according to various embodiments.

FIG. 9 is a block diagram of a storage system in a computing environment, according to various embodiments.

A storage controller 900 receives Input/Output (I/O) requests from production computers 950a,b, . . . k over a network 990 directed toward storage 920, 940 configured to have volumes (e.g., Logical Unit Numbers, Logical Devices, etc.) 922a,b . . . n, and 942a,b . . . l, respectively, where n and l may be different integer values or the same integer value. A volume may be any logical or physical element of storage.

The storage controller 900 further includes a cascading engine 910. The cascading engine 910 performs instant virtual copies of data (e.g., from a production computer 950a, 950b, 950k) to storage 920,940 or between storage 920,940. In certain embodiments, the cascading engine 910 may be executed at another storage controller connected to storage controller 900 instead of, or in addition to, execution at the storage controller 900.

Embodiments are applicable to the transfer of data between any storage mediums. For example, certain embodiments may be used with storage mediums located at a single storage controller, whereas, certain alternative embodiments may be used with storage mediums located at different storage controllers, different physical sites, etc. Each storage device may be a source or a target for an instant virtual copy.

In certain embodiments, removable storages (instead of or in addition to storage 920, 940) may be used to maintain copies. The removable storages may reside at the storage controller 900.

The storage controller 900 may further include a processor complex (not shown) and may comprise any storage controller or server known in the art.

The production computers 950a,b . . . k may comprise any computing device known in the art. The storage controller 900 and production computer system(s) 950a,b . . . k communicate via a network 990, which may comprise any type of network, such as, a Storage Area Network (SAN), a Local Area Network (LAN), a Wide Area Network (WAN), the Internet, an Intranet, etc. The storage 920, 940 may each comprise an array of storage devices, such as Direct Access Storage Devices (DASDs), Just a Bunch of Disks (JBOD), Redundant Array of Independent Disks (RAID), virtualization device, etc.

Additionally, although FIG. 9 illustrates a single storage controller 900, one skilled in the art would know that multiple storage controllers may be connected via a network (e.g., a Local Area Network (LAN), Wide Area Network (WAN), the Internet, etc.), and one or more of the multiple storage controllers may implement the described method and system.

Figure 10:
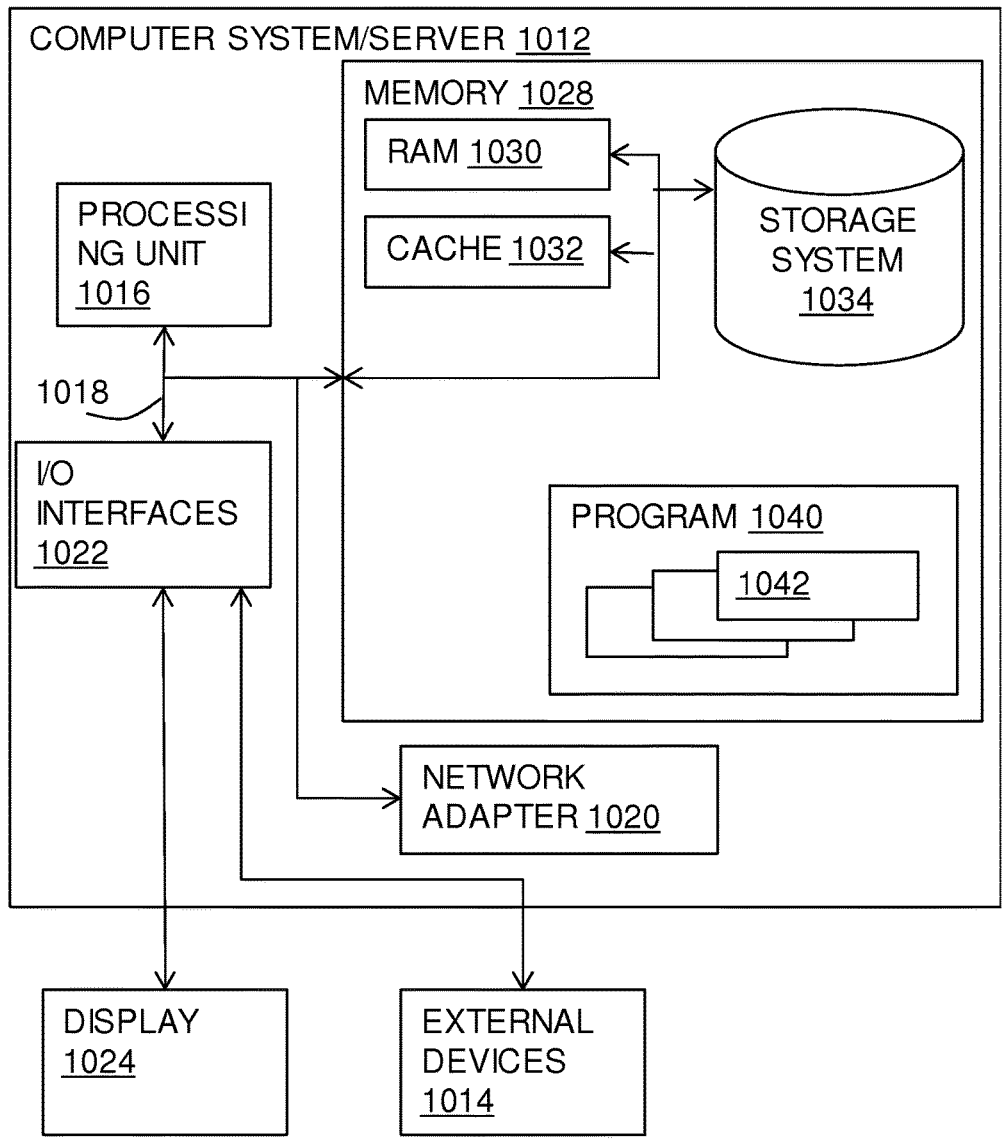
FIG. 10 is a block diagram of an embodiment of a computer system or cloud server, according to various embodiments.

A computing system for implementing aspects of the described system may be provided as described with regard to FIG. 10, which is given in the context of cloud computing implementations but may equally be adapted for non-cloud computing implementations.

The present disclosure may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure including a network of interconnected nodes.

FIG. 10 is a block diagram of an embodiment of a computer system or cloud server, according to various embodiments.

A schematic of an example of computer system or server is shown that may be implemented as a cloud computing node 1000.

Cloud computing node 1000 is only one example of a suitable cloud computing node and is not intended to suggest any limitation as to the scope of use or functionality of embodiments of the disclosure described herein. Regardless, cloud computing node 1000 is capable of being implemented and/or performing any of the functionality set forth hereinabove.

In cloud computing node 1000 there is a computer system/server 1012, which is operational with numerous other general purpose or special purpose computing system environments or configurations. Examples of well-known computing systems, environments, and/or configurations that may be suitable for use with computer system/server 1012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1012 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 1012 in cloud computing node 1000 is shown in the form of a general-purpose computing device. The components of computer system/server 1012 may include, but are not limited to, one or more processors or processing units 1016, a system memory 1028, and a bus 1018 that couples various system components including system memory 1028 to processor 1016.

Bus 1018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1012 typically includes a variety of computer system readable media. Such media may be any available media that is accessible by computer system/server 1012, and it includes both volatile and non-volatile media, removable and non-removable media.

System memory 1028 can include computer system readable media in the form of volatile memory, such as random access memory (RAM) 1030 and/or cache memory 1032. Computer system/server 1012 may further include other removable/non-removable, volatile/non-volatile computer system storage media. By way of example only, storage system 1034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1018 by one or more data media interfaces. As will be further depicted and described below, memory 1028 may include at least one program product having a set (e.g., at least one) of program modules that are configured to carry out the functions of various embodiments.

Program/utility 1040, having a set (at least one) of program modules 1042, may be stored in memory 1028 by way of example, and not limitation, as well as an operating system, one or more application programs, other program modules, and program data. Each of the operating system, one or more application programs, other program modules, and program data or some combination thereof, may include an implementation of a networking environment. Program modules 1042 generally carry out the functions and/or methodologies of embodiments, as described herein.

Computer system/server 1012 may also communicate with one or more external devices 1014 such as a keyboard, a pointing device, a display 1024, etc.; one or more devices that enable a user to interact with computer system/server 1012; and/or any devices (e.g., network card, modem, etc.) that enable computer system/server 1012 to communicate with one or more other computing devices. Such communication can occur via Input/Output (I/O) interfaces 1022. Still yet, computer system/server 1012 can communicate with one or more networks such as a local area network (LAN), a general wide area network (WAN), and/or a public network (e.g., the Internet) via network adapter 1020. As depicted, network adapter 1020 communicates with the other components of computer system/server 1012 via bus 1018. It should be understood that although not shown, other hardware and/or software components could be used in conjunction with computer system/server 1012. Examples, include, but are not limited to: microcode, device drivers, redundant processing units, external disk drive arrays, RAID systems, tape drives, and data archival storage systems, etc.

Figure 11:
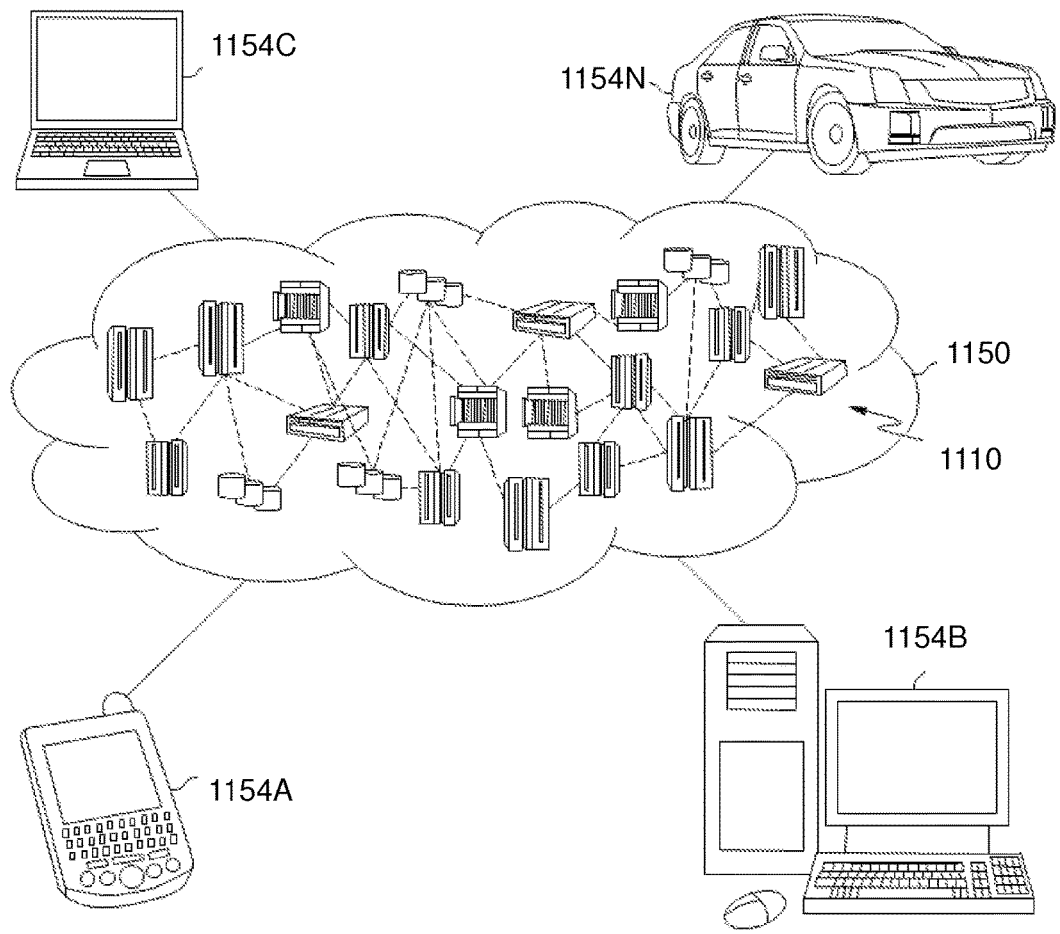
FIG. 11 is a schematic diagram of a cloud computing environment, according to various embodiments.

FIG. 11 is a schematic diagram of a cloud computing environment, according to various embodiments.

An illustrative cloud computing environment 1150 is depicted. As shown, cloud computing environment 1150 comprises one or more cloud computing nodes 1000 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1000 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/ or software as services for which a cloud consumer does not need to maintain resources on a local computing device. It is understood that the types of computing devices 1154A-N shown in FIG. 11 are intended to be illustrative only and that computing nodes 1000 and cloud computing environment 1150 can communicate with any type of computerized device over any type of network and/or network addressable connection (e.g., using a web browser).

Figure 12:
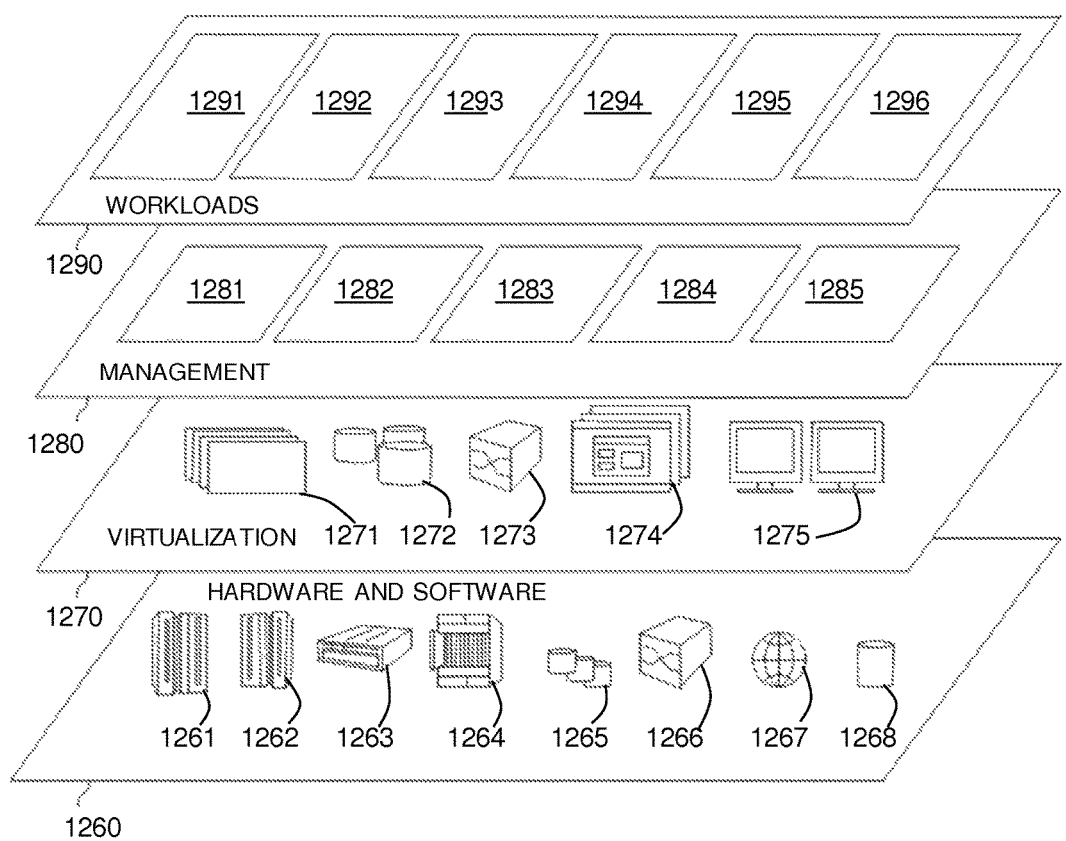
FIG. 12 is a diagram of abstraction model layers of a cloud computing environment, according to various embodiments.

FIG. 12 is a diagram of abstraction model layers of a cloud computing environment, according to various embodiments.

A set of functional abstraction layers provided by cloud computing environment 1150 (FIG. 11) is shown. It should be understood in advance that the components, layers, and functions shown in FIG. 12 are intended to be illustrative only and embodiments of the disclosure, are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Examples of workloads and functions that may be provided from this layer include: mapping and navigation 1291; software development and lifecycle management 1292; virtual classroom education delivery 1293; data analytics processing 1294; transaction processing 1295; and storage controller 900 processing 1296 of an embodiment of the present disclosure. Alternatively, the storage controller 900 processing may be carried out at the management layer 1280.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for storage copy with chain cloning, comprising:
    providing a volume with one or more snapshots in the form of a dependency chain, wherein the volume and one or more snapshots are volume nodes in the dependency chain and providing associated metadata required to maintain the one or more snapshots;
    cloning the dependency chain to create at least one a sparse copy chain including sparse copies of the volume and the one or more snapshots resulting in sparse volume nodes, resulting in a lattice structure of the dependency chain of volume nodes and the at least one or more sparse copy chain of cloned volume nodes;
    defining mappings to a volume node from source and target volume nodes in the dependency chain and sparse source and sparse target volume nodes in the at least one sparse copy chain; and
    defining metadata for each volume node including a state indicating if the data is on the target volume node and a high water mark to indicate which of the dependency chain and at least one sparse copy chains to go to if it is not on the target volume node.

2. The method of claim 1, further comprising:
    maintaining the mappings and the metadata during volume node operations and modifying input/output operations while the volume is part of a cloned sparse copy chain using the mappings and the metadata.

3. The method of claim 1, wherein the metadata includes an indication of a head volume node of a sparse copy chain for use during volume node copy and clean operations.

4. The method of claim 1, wherein the metadata state is a bitmap that is set to true if the data is on the target volume node.

5. The method of claim 1, further comprising:
    repeating the cloning step to add a new sparse copy chain between the original volume dependency chain and a previous cloned mirror chain.

6. The method of claim 1, wherein the lattice structure has dependency chain operations in a first direction and sparse copy chain operations in a second direction perpendicular to the first direction.

7. The method of claim 1, further comprising:
    performing a read operation for a volume node, including:
        determining if a mapping exists from a source volume node or sparse copy volume node to the volume node;
        checking the volume node metadata to determine if the volume node has a target state indicated; and
        checking the volume node metadata to determine a high water mark indication of the correct chain of a target node.

8. The method of claim 1, further comprising:
    performing a write operation for a volume node, including:
        referencing mappings and metadata prior to carrying out the write operation, if required, carrying out write operations to mappings; and
        updating mappings and metadata after the write operation.

9. The method of claim 1, further comprising:
performing a copy operation for a volume node, including:
carrying out a write operation to write a lattice read of a volume node to the volume node when required.

10. The method of claim 1, further comprising:
performing a clean operation for a volume node, including:
carrying out write operations to clean up the metadata.

11. A system for storage copy with chain cloning, comprising:
a processor and a memory configured to provide computer program instructions to the processor to execute the function of the following components:
a point-in-time copy component for providing a volume with one or more snapshots in the form of a dependency chain, wherein the volume and one or more snapshots are volume nodes in the dependency chain and providing associated metadata required to maintain the one or more snapshots;
a cloning component for cloning the dependency chain to create at least one sparse copy chain including sparse copies of the volume and the one or more snapshots resulting in sparse volume nodes;
a lattice structure component for creating a lattice structure of the dependency chain of volume nodes and the at least one sparse copy chain of cloned volume nodes;
a mapping component for defining mappings to a volume node from source and target volume nodes in the dependency chain and sparse source and sparse target volume nodes in the at least one sparse copy chain; and
a metadata component for defining metadata for each volume node including a state indicating if the data is on the target volume node and a high water mark to indicate which of the dependency chain and the at least one sparse copy chain to go to if it is not on the target volume node.

12. The system of claim 11, wherein the mapping component and the metadata component maintain the mappings and the metadata during volume node operations and modifying input/output operations while the volume is part of a cloned sparse copy chain using the mappings and the metadata.

13. The system of claim 11, wherein the metadata component defines metadata including an indication of a head volume node of a sparse copy chain for use during volume node copy and clean operations.

14. The system of claim 11, wherein the metadata state is a bitmap that is set to true if the data is on the target volume node.

15. The system of claim 11, wherein the cloning component is capable of repeating the cloning step to add a new sparse copy chain between the original volume dependency chain and a previous cloned mirror chain.

16. The system of claim 11, wherein the lattice structure has dependency chain operations in a first direction and sparse copy chain operations in a second direction perpendicular to the first direction.

17. The system of claim 11, further comprising a read operation component for:
performing a read operation for a volume node, including:
determining if a mapping exists from a source volume node or sparse copy volume node to the volume node;
checking the volume node metadata to determine if the volume node has a target state indicated; and
checking the volume node metadata to determine a high water mark indication of the correct chain of a target node.

18. The system of claim 11, further comprising a write operation component for:
performing a write operation for a volume node, including:
referencing mappings and metadata prior to carrying out the write operation, if required, carrying out write operations to mappings; and
updating mappings and metadata after the write operation.

19. The system of claim 11, further comprising a copy operation component for:
performing a copy operation for a volume node, including:
carrying out a write operation to write a lattice read of a volume node to the volume node when required.

20. The system of claim 11, further comprising a clean operation component for:
performing a clean operation for a volume node, including:
carrying out write operations to clean up the metadata.

21. A computer program product for storage copy with chain cloning, the computer program product comprising a computer readable storage medium having program instructions embodied therewith, the program instructions executable by a processor to cause the processor to:
providing a volume with one or more snapshots in the form of a dependency chain, wherein the volume and one or more snapshots are volume nodes in the dependency chain and providing associated metadata required to maintain the one or more snapshots;
cloning the dependency chain to create at least one sparse copy chain including sparse copies of the volume and the one or more snapshots resulting in sparse volume nodes, resulting in a lattice structure of the dependency chain of volume nodes and the at least one sparse copy chain of cloned volume nodes;
defining mappings to a volume node from source and target volume nodes in the dependency chain and sparse source and sparse target volume nodes in the at least one sparse copy chain; and
defining metadata for each volume node including a state indicating if the data is on the target volume node and a high water mark to indicate which of the dependency chain and the at least one sparse copy chain to go to if it is not on the target volume node.

* * * * *